US008218058B2

(12) United States Patent  (10) Patent No.: US 8,218,058 B2
Shibata  (45) Date of Patent: Jul. 10, 2012

(54) DRIVE CONTROL UNIT, DRIVE CONTROL METHOD AND PROGRAM THEREOF

(75) Inventor: Ryuji Shibata, Kanagawa (JP)

(73) Assignee: Sony Corporation (JP)

( * ) Notice: Subject to any disclaimer, the term of this patent is extended or adjusted under 35 U.S.C. 154(b) by 541 days.

(21) Appl. No.: 12/386,737

(22) Filed: Apr. 22, 2009

(65) Prior Publication Data

US 2009/0278976 A1    Nov. 12, 2009

(30) Foreign Application Priority Data

Apr. 24, 2008  (JP) ................................ P2008-114279

(51) Int. Cl.
  *G08B 21/00* (2006.01)
  *G03B 13/34* (2006.01)
  *G02B 15/14* (2006.01)
(52) U.S. Cl. ..................... 348/335; 340/686.1; 359/697; 396/52
(58) Field of Classification Search .................. 359/597, 359/697; 348/335; 396/52; 73/514.01, 514.38
  See application file for complete search history.

(56) References Cited

U.S. PATENT DOCUMENTS 7,636,517 B2 * 12/2009 Klinghult ........................ 396/53

FOREIGN PATENT DOCUMENTS

| JP | 7-199033 A | 8/1995 |
| JP | 8-054553 A | 2/1996 |
| JP | 10-142482 A | 5/1998 |
| JP | 2001-004896 A | 1/2001 |
| JP | 2002-221653 A | 8/2002 |
| JP | 2003-114370 A | 4/2003 |
| JP | 2003-324944 A | 11/2003 |
| JP | 2005-091745 A | 4/2005 |
| JP | 2007-322462 A | 12/2007 |

OTHER PUBLICATIONS

English machine translation of JP 2007-322462 A, cited by Applicant.*

* cited by examiner

*Primary Examiner* — Clayton E Laballe
*Assistant Examiner* — Leon W Rhodes, Jr.
(74) *Attorney, Agent, or Firm* — Lerner, David, Littenberg, Krumholz & Mentlik, LLP

(57) ABSTRACT

A drive control unit of the present invention includes: a first external force detecting section for detecting that an external force is applied to a first moving object body movable back and forth in a single direction; and a second initialization processing section which when it is detected that the external force is applied to the first moving object body by the first external force detecting section, moves at least one of second moving object bodies movable back and forth in the single direction to a predetermined second initial position and when it is not detected that the external force is applied to the first moving object body, does not move the second moving object body.

9 Claims, 11 Drawing Sheets

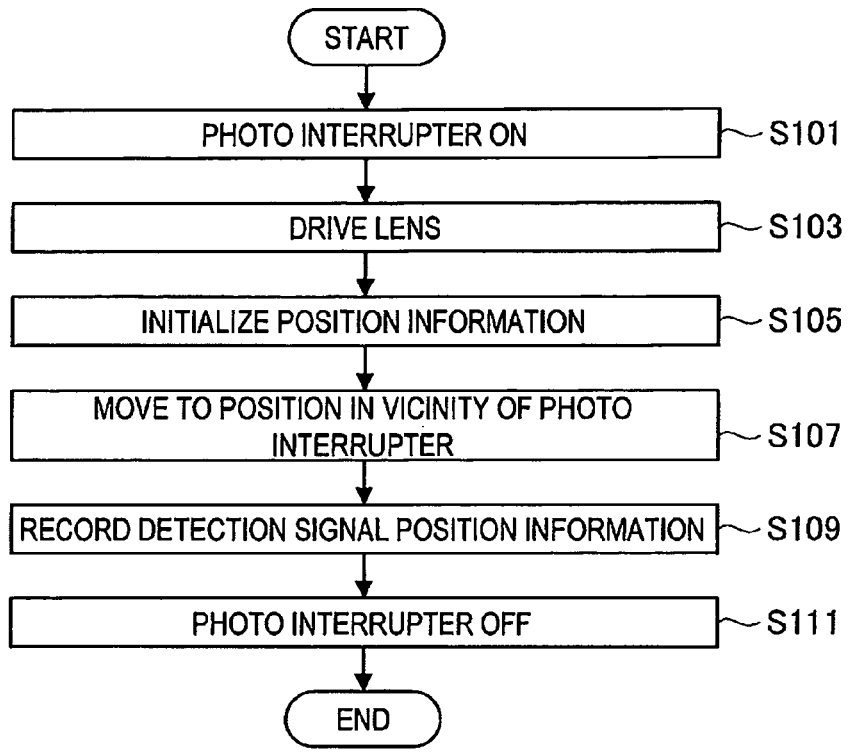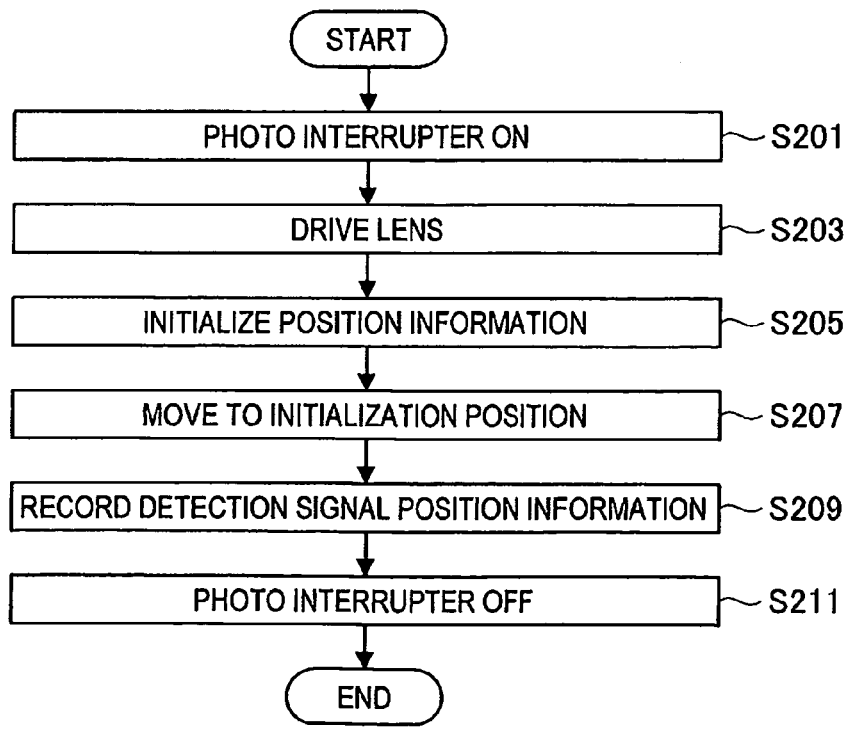

DRIVE CONTROL UNIT, DRIVE CONTROL METHOD AND PROGRAM THEREOF

The present application claims priority from Japanese Patent Application No. JP 2008-114279, filed in the Japanese Patent Office on Apr. 24, 2008, the entire content of which is incorporated herein by reference.

BACKGROUND OF THE INVENTION

1. Field of the Invention

The present invention relates to a drive control unit, drive control method and program thereof.

2. Description of the Related Art

For example, cameras of fixed lens type include a plurality of lenses and the positions of these lenses need to be controlled at a high precision. In most cameras, a target position for moving the lens after its startup processing has been specified preliminarily (for example, infinite position of optical wide angle end (wide end)). For example, the camera uses a reset sensor for detecting a passage of the lens to move the lens to its target position. That is, the lens is once moved to pass the reset sensor and then, it is moved from the reset sensor to a target position at a high precision, so that it is moved to the target position. The lens moving time of this startup time occupies a large percentage of a time until the camera is started up. Thus, if the time until the lens is moved is long, user needs to wait for this while. However, often the camera is started up after user wants to take pictures and if the startup time is long, user often loses a timing of clicking the shutter. Thus, it is desirable that this startup time is short.

As a method for shortening the startup time, Japanese Patent Application Laid-Open No. 1999-173606 described below has disclosed an art for shortening the moving time by disposing the reset sensor in the vicinity of the target position. Further, Japanese Patent Application Laid-Open No. 2003-324944 has proposed an art in which a lens position and a reset sensor position at an operation termination time before the startup are recorded for effective use of these positions in order to shorten the startup time of the lens using a photo interrupter for its reset sensor.

SUMMARY OF THE INVENTION

However, with a trend of reducing the size of the camera and lens in recent years, it has been often difficult to install the reset sensor at an ideal position for the reason of, for example, restrictions of arrangement space. For such a lens, a distance from the reset sensor to the target position is increased so that the startup time is also increased, thereby possibly lowering its operability. Even if no extension of the startup time occurs, it is desirable to further reduce the startup time.

As a method for reducing the startup time, use of, for example, a lead screw and a stepping motor can be considered. That is, the lead screw is used as a drive mechanism such as a lens and the lead screw is rotated by the stepping motor so as to move the lens. In this case, the stepping motor is devised for the reason of its product characteristic to be resistant to an impact and has some extent of such a characteristic that it cannot be moved easily even if it is not powered on (in a state in which no voltage is applied). Thus, it can be considered to start up the camera rapidly without executing a reset detection by means of the reset sensor and moving the lens to its initial position by using the characteristic of such a drive mechanism. However, if the camera is dropped or the camera strikes an obstacle so that an impact is applied thereto, even the stepping motor suffers disengagement or a rotation of the motor due to an external force when the external force due to the impact exceeds its magnitude of some extent. Thus, simply using the aforementioned method disables to detect a motion of the lens because sometimes the lens is moved while the power supply is turned off. In this case, the lens is moved to not a desired initial position, but an abnormal position, so that the startup processing is terminated in an abnormal condition, for example, with a taken image being out of focus. For the reason, it is desirable to control the lens so as to carry out an accurate startup processing even if an external force such as an impact is applied while the startup time is reduced.

The lens of the camera has been described here and a quick, accurate startup processing is demanded in not only this example but also in various devices and members. In case where the image pickup device of a camera is moved, it is demanded that the image pickup device is moved rapidly to an accurate position and if any movable member such as a flash or cover is disposed, reducing the startup time improves the operability of the camera. As other devices, a device in which the movable member (moving object body) is moved to a predetermined position at the time of startup can be mentioned, such as a reproducing/recording device in which its reading/writing head is moved to a predetermined position of a disc like memory medium at the time of startup. In such a device, the startup time is demanded to be as short as possible and at that time, an accurate startup operation needs to be executed.

Accordingly, the present invention has been made in views of the above-described issues, and it is desirable to provide a novel and improved drive control unit, drive control method and program capable of reducing the startup time and preventing a malfunction due to an external force such as an impact.

According to an embodiment of the present invention, there is provided a drive control unit including: a first external force detecting section for detecting that an external force is applied to a first moving object body movable back and forth in a single direction; and a second initialization processing section which executes initialization processing for the position of at least one of second moving object bodies movable back and forth in the single direction depending on a detection result by the first external force detecting section.

According to this structure, it is detected the external force is applied to the first moving object body by the first external force detecting section. Then, the initialization processing on the second moving object body can be executed depending on a detection result by the first external force detecting section by the second initialization processing section. Consequently, the initialization processing on other moving object body (second moving object body) can be executed by reflecting the absence or presence of the external force on a moving object body (first moving object body) as compared with executing the initialization processing on individual moving object body separately.

When it is detected that the external force is applied to the first moving object body by the first external force detecting section, the second initialization processing section moves at least one of the second moving object bodies to a predetermined second initial position and when it is not detected that the external force is applied to the first moving object body, does not move the second moving object body.

According to this structure, when the external force is applied, the second moving object body is moved to the second initial position by the second initialization processing section and when no external force is applied, the second moving object body is not moved. Consequently, when the external force is applied, the second moving object body can be moved to the initial position and when no external force is applied, the second moving object body does not need to be moved.

The drive control unit may further include a first memory section for recording the position information of the first moving object body at the time of operation termination before a startup, and the first external force detecting section may detect that an external force is applied to the first moving object body based on the position information recorded in the first memory section and a detection result at the time of startup by the first position detecting section for detecting the position of the first moving object body.

The first position detecting section may generate a detection signal indicating whether the first moving object body is located in front of or in the back of the predetermined first reference position and the first external force detecting section, if a detection signal by the first position detecting section at the time of startup does not coincide with a detection signal detected by the first position detecting section when the first moving object body is located at a position memorized in the first memory section, may detect that the external force is applied to the first moving object body.

The drive control unit may further include a first termination processing section for moving the first moving object body to the vicinity of the first reference position at the time of operation termination before the startup.

The first external force detecting section may detect an external force applied to a moving object body which can be moved more easily back and forth in the single direction by the external force than the at least one of the second moving object bodies, as the first moving object body.

The drive control unit may further include a first initialization processing section for moving the first moving object body to the predetermined first initial position based on a detection result by the first position detecting section at the time of the startup, and the first external force detecting section may detect that the external force is applied to the first moving object body based on the moving amount of the first moving object body by the first initialization processing section and the position information of the first moving object body memorized in the first memory section.

The drive control unit may further include: a second memory section for recording the position information of the second moving object body at the time of operation termination before the startup; and a second external force detecting section for detecting that the external force is applied to the second moving object body based on the position information recorded in the second memory section and the detection result at the time of the startup by the second position detecting section for detecting the position of the second moving object body and the second initialization processing section, when it is detected that the external force is applied to the second moving object body by the second external force detecting section, may move the second moving object body to the predetermined second initial position.

The second position detecting section may generate a detection signal indicating whether the second moving object body is located in front of or in the back of the predetermined second reference position, and the second external force detecting section, if a detection signal by the second position detecting section at the time of startup does not coincide with a detection signal detected by the second position detecting section when the second moving object body is located at a position memorized in the second memory section, may detect that the external force is applied to the second moving object body.

According to another embodiment of the present invention, there is provided a drive control method including: a first external force detecting step of detecting that an external force is applied to a first moving object body movable back and forth in a single direction; and a second initialization processing step of executing initialization processing for the position of at least one of second moving object bodies movable back and forth in the single direction depending on a detection result in the first external force detecting step.

According to still another embodiment of the present invention, there is provided a program for making a computer achieve a first external force detecting function for detecting that an external force is applied to a first moving object body movable back and forth in a single direction; and a second initialization processing function for executing initialization processing for the position of at least one of second moving object bodies movable back and forth in the single direction depending on a detection result by the first external force detecting function.

According to the embodiments of the present invention described above, any malfunction due to an external force such as a shock can be prevented while reducing the startup time.

BRIEF DESCRIPTION OF THE DRAWINGS

FIG. 4A is an explanatory diagram for explaining an operation at the time of termination processing of the drive control unit of the embodiment;

FIG. 4B is an explanatory diagram for explaining the operation at the time of termination processing of the drive control unit of the embodiment;

DETAILED DESCRIPTION OF THE PREFERRED EMBODIMENTS

Figure 1:
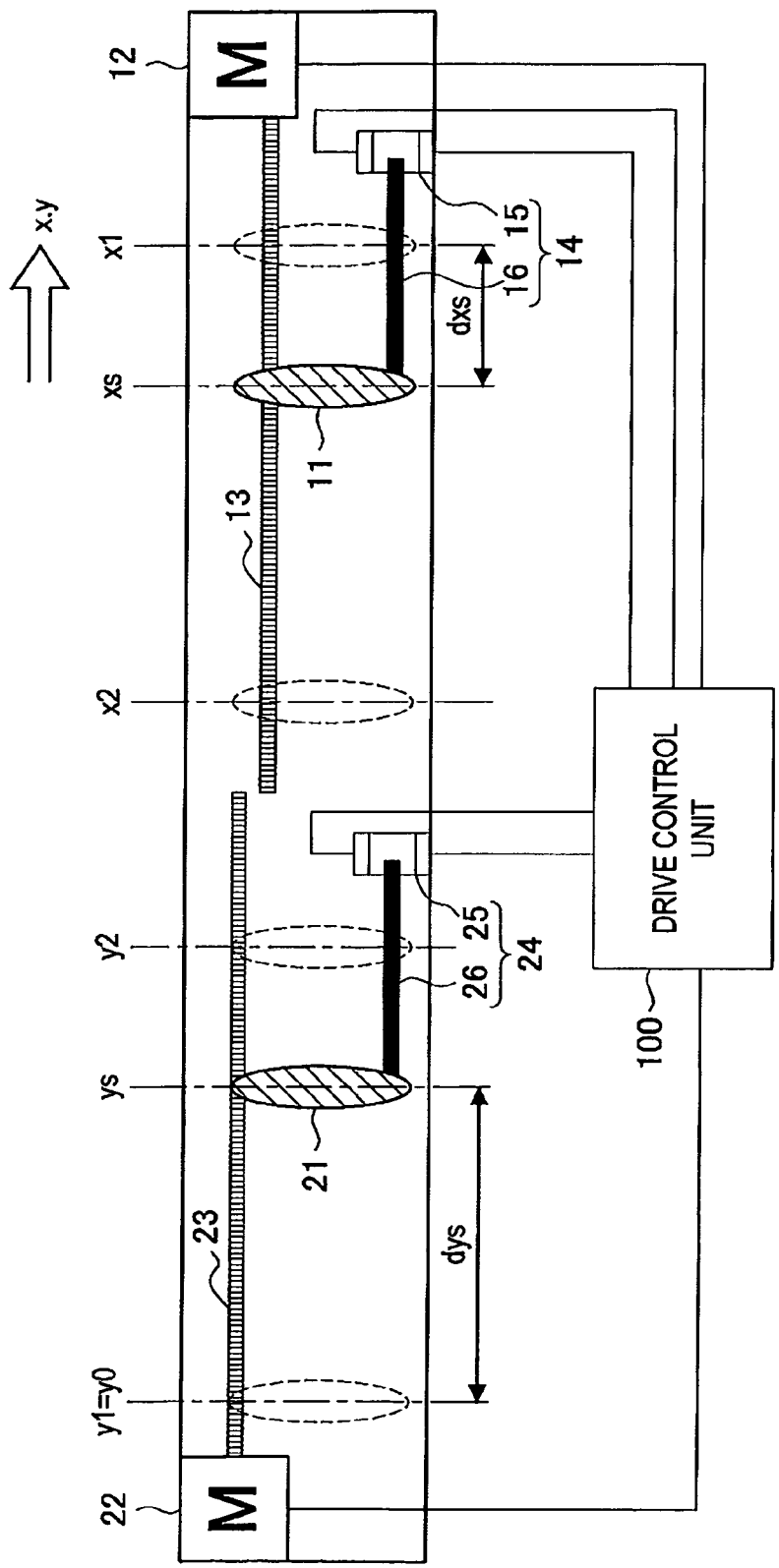
FIG. 1 is an explanatory diagram for explaining the structure of the lens section of a camera to which the drive control unit according to an embodiment of the present invention is applied.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The drive control unit of each embodiment of the present invention can be applied to various apparatuses as long as it can move plural moving object bodies movable back and forth in the same direction. As the apparatus to which the drive control unit can be applied, for example, a still camera and video camera in which a plurality of lenses, image pickup device, flash, cover and the like are moved, and a recording reproduction device for moving a reading/writing head can be mentioned. Of course, this drive control unit can be applied to any mobile apparatus such as a mobile phone having a camera and a recording reproduction device and a notebook personal computer. Hereinafter, to facilitate understanding of the drive control unit of this embodiment, a case of applying this drive control unit to a digital still camera will be described. The camera includes a plurality of moving object bodies internally and particularly, a case of moving the plurality of the lenses will be described. However, needless to say, the application example of the drive control unit of the present invention is not limited to a camera described below and it can be applied to other apparatuses as well as the camera.

<Structure of the Lens Section of Camera>

First, the structure of the lens section of the camera to which the drive control unit of an embodiment of the present invention is applied will be described with reference to FIG. 1. FIG. 1 is an explanatory diagram for explaining the structure of the lens section of the camera to which the drive control unit of this embodiment is applied.

The lens section 1 of the camera is controlled by a drive control unit 100 of this embodiment. The structure of the lens section 1 of the camera which is a control object to be controlled by the drive control unit 100 will be described as follows.

Plural lenses 11, 21 are disposed on the lens section 1 of the camera.

The lens 11 is an example of a first moving object or a focus lens of the camera. The lens 21 is an example of a second moving object body or a zoom lens of the camera. Although the two lenses are represented as the moving object body here, the kind of the moving object body is not restricted to the above-described lens but the quantity of the moving object bodies is not limited as long as two or more are provided.

The lenses 11, 21 have each independent drive mechanism and are supported by each drive mechanism so that they are movable back and forth on an identical or parallel axis by each drive mechanism. It is assumed that the moving direction of the lens 11 is x-axis and the moving direction of the lens 21 is y-axis and then the x-axis and the y-axis are set up in parallel to each other.

Although the drive mechanisms of the lenses 11 and 21 may use a different structure, they may use an identical structure. In the meantime, FIG. 1 shows a drive mechanism having the same structure although the arrangement positions are different. Then, hereinafter, the drive mechanism of one lens 11 will be described and while a duplicated description of the drive mechanism for the other lens 21 is omitted.

For example, the drive mechanism of the lens 11 has a stepping motor 12 and a screw 13.

The stepping motor 12 is an example of the drive source and rotated by a predetermined drive signal (pulse voltage). In the meantime, the drive source is not limited to the stepping motor 12 but the stepping motor 12 cannot be rotated easily passively by an external force except that it is rotated actively by being supplied with a drive signal, as compared with other motor. The stepping motor 12 can be rotated only by a predetermined rotation angle depending on the number of its pulse voltage (pulse number, step number) by receiving a supply of the pulse voltage as a drive signal. Further, the stepping motor 12 is excited even while it is supplied with no drive signal and its rotation shaft is attracted by this magnetic force, so that it cannot be rotated easily by an external force.

The screw (lead screw) 13 is an example of a drive force transmitter and has male threads on its external circumstance while it is extended in the x-axis direction which is a moving direction of the motor 11. The screw 13 is rotated by the stepping motor 12. The supporting member (not shown) of the lens 11 has female threads to be engaged with the male threads of this screw 13. The screw 13 is engaged with the female threads of the supporting member of this lens 11.

Thus, for example, the stepping motor 11 is rotated by a drive signal supplied from the drive control unit 100 and this rotation force rotates the screw 13. Then, the lens 11 in engagement with the screw 13 via the supporting member is moved back and forth of the x-axis along the screw 13.

On the other hand, to control such a motion, the position of the lens 11 needs to be detected. Then, the drive mechanisms of the lenses 11, 21 are provided with each position detecting mechanism. Although this position detecting mechanism may use a different structure for each of the lenses 11, 21, the same structure may be employed. FIG. 1 exemplifies a case where the position detecting mechanism has an identical structure although its arrangement position is different. Hereinafter, the position detecting mechanism of one lens 11 will be described while a duplicated description of the position detecting mechanism of the other lens 21 is omitted.

The position detecting mechanism 14 for the lens 11 is an example of the first position detecting section (the position detecting mechanism 24 is a second position detecting section) and has a photo interrupter 15 and a light shielding panel 16. In FIG. 1, the position detecting mechanism 14 is represented out of the drive control unit 100 of this embodiment for convenience of description. However, this position detecting mechanism 14 takes a role of a reset sensor for the lens section 1 and the drive control unit 100. Thus, the position detecting mechanism 14 may be contained in the structure of the drive control unit 100. Different from that, the position detecting mechanism 14 is permitted not to be contained in the structure of the drive control unit 100 and the drive control unit 100 may acquire a detection signal from outside.

The photo interrupter (sensor) 15 has a light emission section and light receiving section (not shown) opposed to each other and light emitted by the light emission section is received by the light receiving section. Then, the photo interrupter 15 detects that light between the light emission section and the light receiving section is shielded so as to detect an absence or presence of any measuring object and its position. The photo interrupter 15 generates its detection result, that is, a detection signal indicating a light receiving state of the light receiving section. That is, if the detection signal of the photo interrupter 15 is a certain value (for example, 0), it indicates that no measuring object is inserted between the light emission section and the light receiving section and if it is the other value (for example, I1s), it indicates that the measuring object is inserted between the light emission section and the light receiving section. For example, this detection signal may indicate an absence or presence of any measuring object or its position with its polarity (plus or minus). In the lens section 1 of this camera, as the measuring object, the light shielding panel 16 can be picked up.

The light shielding panel 16 is fixed to the supporting member (not shown) of the lens 11. The light shielding panel 16 has a shape extending in parallel to the screw 13 and is formed to be capable of entering or leaving a section between the light emission section and the light receiving section. Thus, when the lens 11 is moved in parallel to the x-axis, the light shielding panel 16 is moved in parallel, so that it is inserted in the photo interrupter 15 or departing from the photo interrupter 15.

When the lens 11 is located forward of a reference position xs (first reference position, reference position ys (second reference position) with respect to the lens 21) (object side, upstream side of light, minus direction of the x-axis), the light shielding panel 16 is not inserted into the photo interrupter 15 and when the lens 11 is located backward of the reference position xs (imager side, downstream side of light, plus direction of the x-axis), it is inserted into the photo interrupter 15.

On the other hand, as described above, the stepping motor 22 and the screw 23 are similarly disposed as a drive mechanism for the lens 21 and as the position detecting mechanism 24, the photo interrupter 25 and the light shielding panel 26 are disposed.

In the meantime, drive signals to the stepping motors 12, 22 are supplied from the drive control unit 100 and the detection signals of the photo interrupters 15, 25 are supplied to the drive control unit 100.

<Structure of Drive Control Unit 100>

Figure 2:
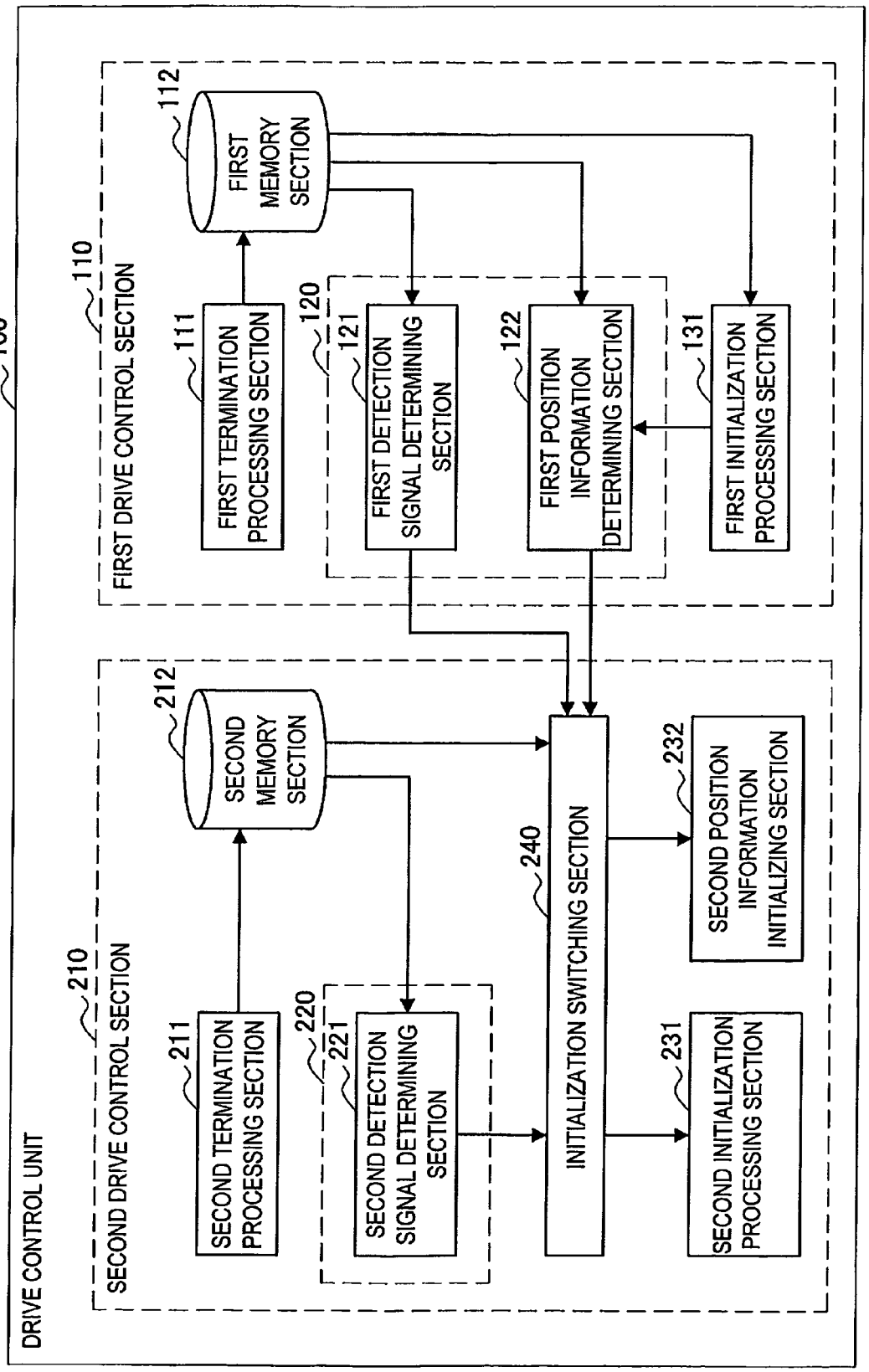
FIG. 2 is an explanatory diagram for explaining the structure of the drive control unit according to the embodiment.

Next, the drive control unit 100 according to an embodiment of the present invention will be described with reference to FIG. 2. FIG. 2 is an explanatory diagram for explaining the structure of the drive control unit of this embodiment.

As shown in FIG. 2, the drive control unit 100 of this embodiment has a first drive control section 110 for driving the focus lens (example of first moving object body) 11 and a second drive control section 210 for driving a zoom lens (example of second moving object body) 21.

The first drive control section 110 generates a drive signal and supplies it to the stepping motor 12 in order to move the lens 11 to a desired position. Then, the stepping motor 12 is rotated only by a rotation amount corresponding to the step number of this drive signal so as to move the lens 11 back and forth on the x-axis (screw 13). On the other hand, the second drive control section 210 generates a drive signal and supplies it to the stepping motor 22 in order to move the lens 21 to a desired position. Then, the stepping motor 22 is rotated just by a rotation amount corresponding to the step number of the drive signal so as to move the lens 21 back and forth on the y-axis (screw 23).

The drive control unit 100 of this embodiment has a feature in the drive control at the time of termination processing and initialization processing in order to shorten the startup processing time. Thus, hereinafter, the drive control at the time of the termination processing and initialization processing with the drive control unit 100 will be described below and description of the drive control in other period is omitted. The "termination processing" (processing at the time of operation termination) refers to a processing which is carried out when control on the positions of the lenses 11, 21 which are moving object bodies is terminated, such as when the power supply of the camera is turned off or when the image pickup mode of the camera is terminated. The timing by which this termination processing is to be carried out is generally called "termination time".

The "initialization processing" (processing at the time of startup) refers to a processing carried out when control on the positions of the lenses 11, 21 which are moving object bodies is started, for example, when the power supply of the camera is turned on or when the image pickup mode of the camera is started. This initialization processing may be carried out, for example, when any abnormality is generated in position control of the lenses 11, 21, as well as at the time of startup. The timing under which this initialization processing is carried out is generally called "startup time" here. That is, the drive control unit 100 executes the initialization processing at the time of startup. However, the initialization processing means that the control on the initialization is started after the control on the positions of the lenses 11, 21 is terminated by the termination processing. Thus, starting of a control when the power supply of the camera is turned on first or the termination processing is not carried out properly is called "abnormal initialization processing" and distinguished from the aforementioned "initialization processing".

Figure 3A:
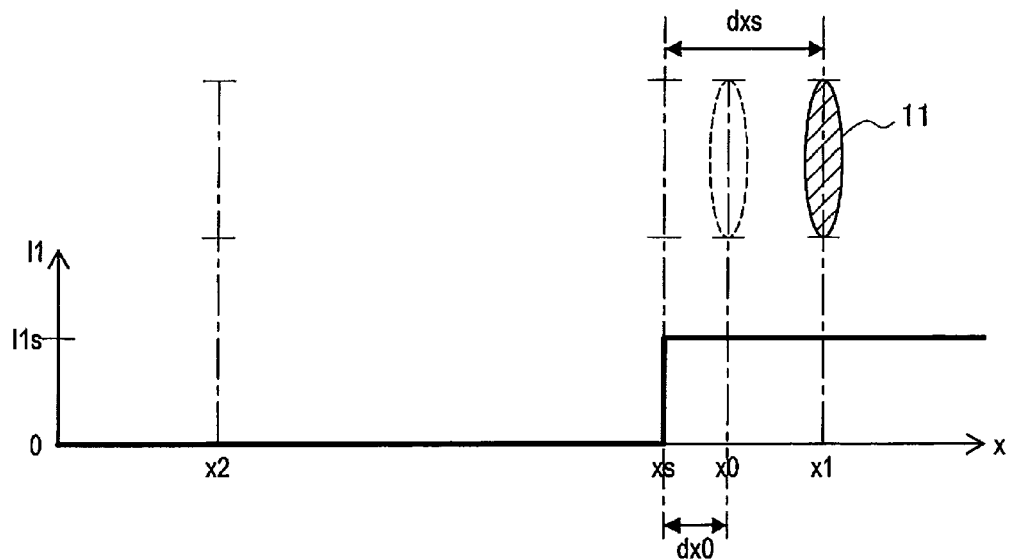
FIG. 3A is an explanatory diagram for explaining the positional relationship of the lens to be controlled by the drive control unit of the embodiment.
Figure 3B:
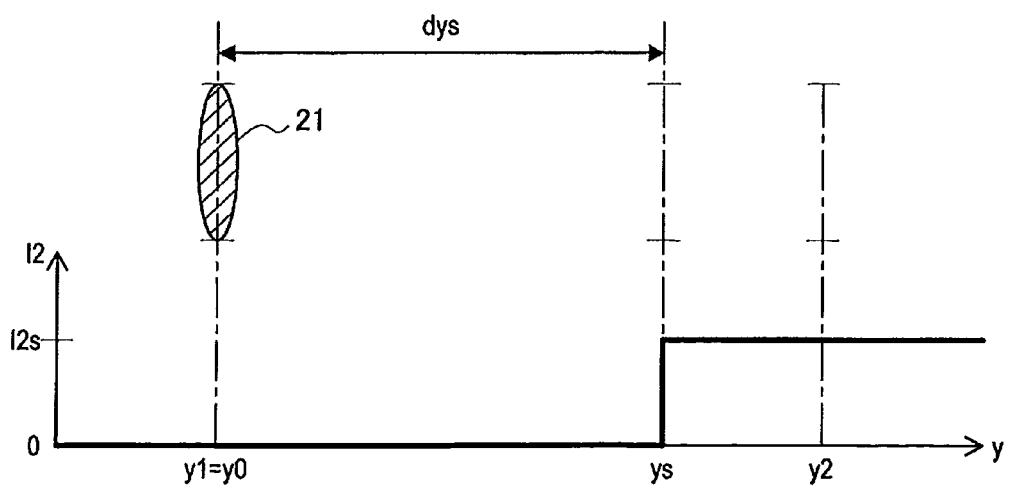
FIG. 3B is an explanatory diagram for explaining the positional relationship of the lens to be controlled by the drive control unit of the embodiment.

Hereinafter, the configuration of the drive control section 100 will be described further in detail. To facilitate understanding of each component, the positions of the lenses 11 and 21 which are driven by that configuration will be described first. FIGS. 3A and 3B show the positional relationship of the lenses 11 and 21.

FIG. 3A shows the relation between the position of the lens 11 and a detection signal of the lens 11 (that is, detection signal of the light shielding panel 16) by the photo interrupter 15. On the other hand, FIG. 3B shows the relation between the position of the lens 21 and a detection signal of the lens 21 (that is, detection signal of the light shielding panel 26) by the photo interrupter 25. In FIGS. 3A and 3B, the moving distances of the lenses 11, 21 (that is, lengths of the screws 13, 23) are made equal, and the arrangement positions of the photo interrupters 15, 25 and the lengths of the light shielding panels 16, 26 are made equal to facilitate understanding of the positional relationship of the lenses 11, 21 and both the Figures are represented together at up and down positions. However, the moving distance and length may be different depending on the design of the lens section 1.

The detection signal I1 indicates a detection signal by the photo interrupter 15. If the detection signal I1 is value I1s, it indicates that the light shielding panel 16 is inserted into the photo interrupter 15 and if the detection signal I1 is value 0, it indicates that the light shielding panel 16 is not inserted into the photo interrupter 15. Likewise, the detection signal I2 indicates a detection signal by the photo interrupter 25. Then, if the detection signal I2 is value I2s, it indicates that the light shielding panel 16 is inserted into the photo interrupter 25 and if the detection signal I2 is value 0, it indicates that the light shielding panel 26 is not inserted into the photo interrupter 25.

A reference position xs in FIG. 3A indicates a position where the light shielding panel 16 is inserted into the photo interrupter 15, that is, the position of a border between a position where the lens 11 is detected by the photo interrupter 15 and a position where it is not detected. Likewise, a reference position ys in FIG. 3B indicates a position where the light shielding panel 16 is inserted into the photo interrupter 25, or the position of a border between a position where the lens 21 is detected by the photo interrupter 25 and a position where it is not detected. Thus, if the lens 11 is located in the plus direction of the x-axis with respect to the reference position xs, the detection signal I1 of the photo interrupter 15 is a value I1s and if the lens 11 is located in the minus direction of the x-axis with respect to the reference position xs, the detection signal I1 of the photo interrupter 15 is a value 0. Likewise, if the lens 21 is located in the plus direction of the y-axis with respect to the reference position ys, the detection signal I2 of the photo interrupter 25 is a value I2s and if the lens 21 is located in the minus direction of the y-axis with respect to the reference position ys, the detection signal I2 of the photo interrupter 25 is a value 0. Thus, the photo interrupters 15, 16 generate a detection signal which detects whether the lenses 11, 21 are located in front of (minus direction of the x- and y-axis) or located in the back of (plus direction of the x- and y-axis) of the reference positions xs, ys.

Respective positions described in FIGS. 3A and 3B will be described.

A position x1 of the lens 11 which is a focus lens indicates an optical infinite end the lens 11 is, for example, moved to this optical infinite end (position x1) by the initialization processing. A position x2 of the lens 11 indicates an optical near end. On the other hand, a position y1 of the lens 21 which is a zoom lens indicates an optical wide angle end and the lens 21 is, for example, moved to this optical wide angle end (position y1) by the initialization processing. A position y2 of the lens 21 indicates an optical telescopic end. That is, after the initialization processing, the drive control unit 100 of this embodiment locates the lens 11 at the position x1 and the lens 21 at the position y1.

The matters about FIGS. 3A and 3B described here are common to other drawings (FIGS. 5A, 5B, 7A to 9A) and thus, description of the same things in other drawings is omitted.

FIG. 2 is referred to together with FIGS. 3A and 3B and then, the configuration of the drive control unit 100 will be described again.

As described above, the drive control unit 100 includes a first drive control section 110 and a second drive control section 210. The first drive control section 110 and the second drive control section 210 have a following structure in order to execute the termination processing and initialization processing.

(First Drive Control Section 110)

As shown in FIG. 2, the first drive control section 110 includes a first termination processing section 111, a first memory section 112, a first external force detecting section 120 and a first initialization processing section 131.

The first termination processing section 111 executes the termination processing to the lens 11 at the time of operation termination. The first termination processing section 111 generates a drive signal and rotates the stepping motor 12 as the termination processing so as to move the lens 11 to a termination position x0. This termination position x0 is preferred to be set in the vicinity of the reference position xs and further in the vicinity of the reference position xs in the plus direction of the x-axis with respect to the reference position xs. Assume that a distance between this reference position xs and the termination position x0 is distance dx0.

Although the first termination processing section 111 may move the lens 11 just to the termination position x0, it may move the lens 11 to the termination position x0 more precisely after the position of the lens 11 is detected. In this case, the first termination processing section 111 moves the lens 11 to a position where the detection result of the photo interrupter 15 to the lens 11 is inverted. That is, for example, if the detection signal I1 of the photo interrupter 15 is a value I1s, the first termination processing section 111 moves the lens 11 in the minus direction of the x-axis so as to allow it to pass the reference position xs. Then, the detection signal I1 is changed to a value 0. Thus, by determining that the lens 11 is located on the reference position xs when this change occurs, the first termination processing section 111 moves the lens 11 only by a distance dx0 in the plus direction of the x-axis from the reference position xs. On the other hand, if the detection signal I1 at the time of the termination processing start is a value 0, the first termination processing section 111 moves the lens 11 in an opposite direction to the aforementioned one and after allowing to pass the reference position xs, moves it to the termination position x0. By moving in this way, the position of the lens 11 after the termination processing can be determined accurately. After that, the first termination processing section 111 records the position of the lens 11 after the termination processing, that is, the termination position 11 in the first memory section 112 and then terminates the termination processing. Although only the position information of the termination position x0 (first position information) may be recorded in the first memory section 112, the value I1s of the detection signal I1 of the photo interrupter 15 at that position as well as the first position information may be recorded.

The first external force detecting section 120 detects whether or not any external force is applied to the lens 11 at the time of the startup based on the detection signal of the photo interrupter 15 and the first position information recorded in the first memory section 112. Thus, the first external force detecting section 120 has a first detection signal determining section 121 and a first position information determining section 122.

The first detection signal determining section 121 drives the photo interrupter 15 at the time of the startup so as to acquire its detection signal. The first detection signal determining section 121 determines whether or not the value of a detection signal (for example, the value I1s or a value 0) acquired at the startup time is equal to the value of a detection signal to be detected by the photo interrupter 15 at the first position information (that is, termination position x0) recorded in the first memory section. Then, if the both detection signals are not equal, the first detection signal determining section 121 detects that an external force is applied to the lens 11 and outputs an external force detection signal (initialization request signal to the lens 21).

Assume that when the position where the detection signal I1 by the photo interrupter 15 turns to the value I1s is set at the termination position x0 as mentioned in this embodiment, a larger external force than the position holding force of the stepping motor 12 is applied in the minus direction of the x-axis. Then, the lens 11 is moved in the minus direction of the x-axis. If, at this time, for example, the external force is large, so that the lens 11 is moved beyond the reference position xs, the detection signal I1 which the photo interrupter 15 detects at the startup time is not the value I1s but the value 0. Thus, in this case, the first detection signal determining section 121 can detect that any external force is applied to the lens 11.

In the meantime, in this embodiment, a case where the first detection signal determining section 121 cannot detect that any external force is applied can occur, for example, when the external force is applied in the plus direction of the x-axis or when the external force is not so large as the lens 11 is allowed to pass the reference position xs. However, the drive control section 100 of this embodiment has a first position information determining section 121 for detecting that any external force is applied in such a case also. This first position information determining section 121 will be described after a description of the first initialization processing section 131.

The first initialization processing section 131 executes the initialization processing on the lens 11 based on the detection signal of the photo interrupter 15 at the time of the startup. That is, the first initialization processing section 131 moves the lens 11 to the initialization position x1 (optical infinite end) to which the lens 11 should be moved by the initialization processing. At this time, the first initialization processing section 131 executes a following processing in order to move the lens 11 to the initial position x1.

That is, the first initialization processing section 131 moves the lens 11 until the detection result of the photo interrupter 15 is reversed at the startup time. That is, the first initialization processing section 131 moves the lens 11 in the minus direction of the x-axis if the detection signal I1 is the value I1s and allows it to pass the reference position xs. On the other hand, if the detection signal I1 is the value 0, the first initialization processing section 131 moves the lens 11 in the plus direction of the x-axis and allows it to pass the reference position xs. Then, the first initialization processing section 131 determines that the lens 11 is located at the reference position xs when the detection signal I1 is changed and moves the lens 11 only by a distance dxs from that position in the plus direction of the x-axis. As a result, the first initialization processing section 131 can move the lens 11 to the initial position x1 accurately.

There exists a "play" in the drive mechanism of the lens 11 and the like, so that often there exists a hysteresis in the motion of the lens 11. In this case, for example, when the lens 11 is moved to a desired position, the first initialization processing section 131 always moves the lens 11 in a single direction in a last period of this moving thereby controlling the position of the lens 11 more accurately. That is, when the lens 11 is always moved from the plus direction to the minus direction, the first initialization processing section 131 moves the lens 11 in the minus direction of the x-axis if the detection signal I1 is the value I1s and allows it to pass the reference position xs. The first initialization processing section 131 assumes that the lens 11 is located at the reference position xs when the detection signal I1 is changed. Contrary to this, the first initialization processing section 131 moves the lens 11 in the plus direction of the x-axis if the detection signal I1 is the value 0 and allows it to pass the reference position xs and further moves the lens 11 in the minus direction of the x-axis, allowing it to pass the reference position. In this case, the first initialization processing section 131 assumes that when the detection signal I1 is changed for the second time, the lens 11 is located at the reference position xs. That is, in this case, the first initialization processing section 131 controls the position by moving the lens 11 in the minus direction of the x-axis so as to reduce an error (play) between when it is moved in the plus direction and when it is moved in the minus direction, thereby achieving a higher precision position control. The correction to the position hysteresis of the lens 11 may be always carried out by the first termination processing section 111, the second termination processing section 211, a second initialization processing section 231 or the like when the lens 11, 21 is moved. A detailed description of each structure is omitted.

The initialization processing by the first initialization processing section 131 is carried out regardless of a detection result for an external force by the first external force detecting section 120, that is, whether or not any external force is applied to the lens 11. Then, the first initialization processing section 131 outputs a distance by which the lens 11 is moved until it reaches the reference position xs and its direction (moving amount d) to the first position information determining section 122. Then, the first position information determining section 122 detects an absence or presence of any external force based on this moving amount d. Next, the first position information determining section 122 will be described.

The first position information determining section 122 determines whether or not any external force is applied, based on the moving amount d by which the first initialization processing section 131 moves the lens up to the reference position xs and the first position information (information regarding the termination position x0) recorded in the first memory section 112.

This detection process of external force will be described in more detail.

That is, the first position information determining section 122 determines whether or not the moving amount d of the lens 11 in the initialization processing is equal to a moving amount by which the lens 11 should be moved in the initialization processing when the lens 11 is located at the termination position x0 at the startup time (that is, distance dx0). If the both moving amounts are not equal, the first position information determining section 122 detects that any external force is applied to the lens 11 and outputs an external force detection signal. Although this external force detection is carried out by the first detection signal determining section 121, a case where an applied external force cannot be detected exists in the first detection signal determining section 121 as described above. In this case, if the external force is larger than the position holding force of the stepping motor 12, the lens 11 is moved back and forth in the x-axis direction. Therefore, if an external force which should be detected is applied to affect the positions of the lenses 11, 21, the moving amount d at the startup time is not equal to the distance dx0 at the time of termination but is increased or decreased from this distance dx0. Then, the first position information determining section 122 can detect that any external force is applied by detecting an increase/decrease of the moving amount d from the distance dx0.

A statement that the moving amount d is equal to the distance dx0 means that they do not need to be strictly equal to each other, for example, if a detection error of the position detecting mechanism 14 or a position accuracy requested to the lens 11 is assumed to be an error $\Delta d$, the moving amount d is within the range of Formula 1 below.

$$dx0 - \Delta d \leq d \leq dx0 + \Delta d \quad \text{(Formula 1)}$$

The first position information determining section 122 may detect an external force based on not the distance dx0 but the termination position x0. In this case, the first position information determining section 122 calculates the position x of the lens 11 at the startup time from the moving amount d and determines whether or not that position x is located within the range of the error $\Delta d$ with respect to the termination position x0. That is, the position x of the lens 11 at the startup time is expressed by a following Formula 2. Then, the first position information determining section 122 detects that any external force is applied unless the position x is within the range of the Formula 3 below.

$$x = xs - d \quad \text{(Formula 2)}$$

$$x0 - \Delta d < x < x0 + \Delta d \quad \text{(Formula 3)}$$

A first moving object body (for example, lens 11) provided with the first external force detecting section 120 which contains the first position information determining section 122 and the first detection signal determining section 121 is preferred to be set in the moving object body which is affected more by the external force than the other moving object body. That is, in this embodiment, the lens 11 is affected by the external force more easily than the lens 21. In other words, the lens 11 is affected by an external force even if it is of an extent which cannot move the lens 21 and moved back and forth in the x-axis. By providing such a lens 11 with the first external force detecting section 120, it can be detected that the external force is applied at a high precision. In the meantime, the lens affected by the external force easily may be determined by for example, design or experiment. As an example of the first moving object body which is affected easily by the external force, if the position holding force of the drive mechanism (stepping motor 12, 22 and screw 13, 23 and the like) to each drive mechanism is the same, it is permissible to use an moving object body heavier than other moving object body. The reason is that in case of a heavy moving object body, if its position holding force is the same, a large force is applied under a smaller acceleration and consequently, it can be influenced more by the external force than other moving object body. In the meantime, the position holding force depends on the type of the motor (for example, number of windings, diameter and the like of the motor), structure of a moving frame (for example, clearance between the lead screw and nut, structure thereof and the like). Thus, in this case also, the lens which is affected easily by the external force is preferred to be determined by design or experiment.

Further, the first moving object body provided with the first external force detecting section 120 is preferred to be so set that a distance between the initial position x1 and the reference position xs is shorter than the other moving object body. That is, as described above, the first moving object body provided with the first external force detecting section 120 undergoes the initialization processing by the first initialization processing section 131 every startup time. At the time of the initialization processing, first, the first moving object body is moved to the reference position xs and its accurate position is specified. After that, it is moved only by the accurate amount (distance dxs) to reach the initial position x1. Therefore, the moving object body having this short distance dxs is preferred to be provided with the first external force detecting section 120, so as to reduce a time required for the initialization processing. The position detecting mechanism 14 to the first moving object body provided with the first external force detecting section 120 may be disposed so that the distance between the initial position x1 and the reference position xs is short.

(Second Drive Control Section 210)

Next, the second drive control section 210 will be described.

As shown in FIG. 2, the second drive control section 210 includes a second termination processing section 211, a second memory section 212, a second external force detecting section 220, a second initialization processing section 231, a second position information initialization section 232, and an initialization switching section 240.

The second termination processing section 211 executes termination processing to the lens 21 at the time of operation termination. As a termination processing, the second termination processing section 211 generates a drive signal to rotate the stepping motor 22 to move the lens 21 to the termination position y0. This termination position y0 is set to be equal to the initial position y1 of the lens 21.

In the meantime, although the second termination processing section 211 may move the lens 21 just to the termination position y0, the lens 21 may be moved to the termination position y0 more accurately after the position of the lens 21 is detected. In this case, the second termination processing section 211 moves the lens 21 up to a position where the detection result of the photo interrupter 25 to the lens 21 is inverted. That is, if the detection signal I2 of the photo interrupter 21 is a value I2s, the first termination processing section 211 moves the lens 21 in the minus direction of the y-axis and allows it to pass a reference position ys. Then, the detection signal I2 is changed to the value 0. Thus, the second termination processing section 211 determines that the lens 21 is located at the reference position ys when this change occurs and moves the lens 21 by a distance dys from the reference position ys in the minus direction of the y-axis. On the other hand, if the detection signal I2 at the time of termination processing start is the value 0, the second termination processing section 211 moves the lens in an opposite direction to allow it to pass the reference position ys and after that, the lens 21 is moved up to the termination position y0. By moving in this way, the position of the lens 21 after the termination processing can be determined accurately. After that, the second termination processing section 211 records the position of the lens 21 after the termination processing, that is, the termination position y0 in the second memory section 212 and terminates the termination processing. Although the position information (second position information) of the termination position y0 may be recorded in the second memory section 212, only the value 0 of the detection signal I2 of the photo interrupter 25 at that position may be recorded.

The second external force detecting section 220 detects whether or not any external force is applied to the lens 21 based on the detection signal of the photo interrupter 25 and the second position information (or value 0 of the detection signal I2) recorded in the second memory section 212 at the time of startup. Thus, the second external force detecting section 220 has a second detection signal determining section 221.

Like the first detection signal determining section 121, the second detection signal determining section 221 drives the photo interrupter 25 to acquire its detection signal at the time of startup. Then, the second detection signal determining section 221 determines whether or not the value (for example, value I1s or value 0) of the detection signal acquired at the time of startup is equal to the value (value 0 of the detection signal I2 at the time of termination processing) of the detection signal which should be detected by the photo interrupter 25 in the second position information (that is, termination position y0) recorded in the second memory section. If the both detection signals are not equal, the first detection signal determining section 121 detects that an external force is applied to the lens 11 and outputs an external force detection signal.

Assume that when the position where the detection signal I2 by the photo interrupter 25 turns to the value 0 is set at the termination position y0 like this embodiment, a larger external force than the position holding force of the stepping motor 22 is applied in the plus direction of the y-axis. Then, the lens 21 is moved in the plus direction of the y-axis. At this time, if the external force is so large that the lens 21 is moved beyond the reference position ys, the detection signal I2 detected by the photo interrupter 25 at the time of startup is not the value 0 but the value I2s. Thus, in this case, the second detection signal determining section 221 can detect that the external force is applied to the lens 21.

Even if the second external force detecting section 220 of this embodiment has no structure corresponding to the first position information determining section 122 possessed by the first external force detecting section 120 which detects an external force based on the moving amount, the drive control unit 100 can detect an external force appropriately. The reason why the drive control unit 100 can detect an external force appropriately will be described as follows by taking a case where the external force cannot be detected by the second external force detecting section 220 alone as an example.

That is, there is a possibility that the second detection signal determining section 221 cannot detect that any external force is applied if the external force is applied in the minus direction of the y-axis. However, the termination position y0 of the lens 21 is set in the minus direction of the y-axis and the termination position x0 of the lens 11 is set in the plus direction of the x-axis (plus direction of the y-axis) which is opposite thereto. Thus, the first detection signal determining section 121 can detect an external force in the minus direction of the x-axis and the second detection signal determining section 221 can detect an external force in the plus direction of the y-axis (plus direction of the x-axis). Therefore, the drive control unit 100 of this embodiment can detect that an external force is applied regardless of the direction of the external force (plus or minus direction of the x-axis and y-axis).

Sometimes the second detection signal determining section 221 cannot detect that any external force is applied even if the external force is not so large as the lens 21 is allowed to pass the reference position ys. However, in this case, it is detected that the external force is applied to the lens 11 affected more by the external force than the lens 21 by the first position information determining section 122. Therefore, in this case, a possibility that the external force is applied to the lens 21 also is large. Thus, the drive control unit 100 of this embodiment can detect that the external force is applied to the lens 21 by detecting that the external force is applied to the lens 11.

In the meantime, a distance dys between the initial position y1 of the lens 21 and the reference position ys is larger than the distance dxs between the initial position x1 of the lens 11 and the reference position xs. The initial position y1 of the lens 21 is preferred to be set in the vicinity of the reference position ys. That is, the distance between the reference position ys and the initial position y1 is preferred to be shortened by disposing the photo interrupter 25 in the vicinity of the initial position y1. However, the arrangement space of each component is limited with a trend of reduction in the size of the unit in recent years. Thus, in this embodiment, a case where the reference position ys cannot be provided on the initial position y1 (optical wide angle end) is exemplified for the reason of a limitation of the structure.

The initialization switching section 240 switches the initialization processing to the lens 21 at the time of startup. At this time, the initialization switching section 240 switches a content to be executed in the initialization processing depending on whether or not any external force is detected in a period after the termination processing until the startup time. Then, the initialization switching section 240 executes a simple initialization processing unless any external force is applied, and if any external force is applied, executes ordinary initialization processing.

When the initialization switching section 240 acquires any one of an external force detection signal output from the first external force detecting section 120 (first detection signal determining section 121 or first position information determining section 122) and an external force detection signal output from the second external force detecting section 220 (second detection signal determining section 221), it makes the second initialization processing section 231 start the initialization processing. On the other hand, when the initialization switching section 240 does not acquire any external force detection signal, it makes the second position information initialization section 232 start a simple initialization processing. In the meantime, determining that the initialization switching section 240 does not acquire any external force detection signal may be carried out based on a fact that the external force detection signal is not acquired in a predetermined time interval or a fact that no external force detection signal is acquired when the initialization of the lens 11 by the first initialization processing section 131 is terminated.

The second initialization processing section 231 executes the initialization processing of the lens 21 based on a detection signal of the photo interrupter 25 like the aforementioned first initialization processing section 131, only when the initialization switching section 240 acquires an external force detection signal. That is, the second initialization processing section 231 moves the lens 21 to the initial position y1 (optical wide angle end) to which the lens 21 should be moved, by the initialization processing. At this time, the second initialization processing section 231 carries out a following processing to move the lens 21 to the initial position y1.

That is, when the initialization switching section 240 acquires an external force detection signal, there is a possibility that an external force is applied to the lens 21 and the lens 21 is moved from the termination position y0 (that is, initial position y0). Then, the second initialization processing section 231 moves the lens 21 until the detection result of the photo interrupter 25 is inverted. That is, if the detection signal I2 is the value I2s, the second initialization processing section 231 moves the lens 21 in the minus direction of the y-axis and allows it to pass the reference position ys. On the other hand, if the detection signal I2 is the value 0, the second initialization processing section 231 moves the lens 21 in the plus direction of the y-axis and allows it to pass the reference position ys. Then, the second initialization processing section 231 determines that the lens 21 is located at the reference position ys when the detection signal I2 is changed and moves the lens 21 by a distance dys from that position in the minus direction of the y-axis. As a result, the second initialization processing section 231 can move the lens 21 to the initial position y1 accurately.

Thus, when the initialization switching section 240 acquires an external force detection signal, that is, an external force is applied to the lens 21, the same initialization processing as the lens 11 is carried out on the lens 21. On the other hand, if no external force is applied, the second initialization processing section 231 does not move the lens 21 and a simple initialization processing by the second position information initialization section 232 is carried out.

The second position information initialization section 232 carries out a simple initialization processing on the lens 21 unless the initialization switching section 240 acquires any external force detection signal. For example, the second position information initialization section 232 may simply update position information necessary for moving the lens 21 to the second position information (that is, termination position y0 (initial position y1)) recorded in the second memory section 212 as the simple initialization processing. Although the simple initialization processing by the second position information initialization section 232 is not limited to this example, the initialization processing based on only the second position information recorded in the second memory section 212 and the excitation phase information of the stepping motor 22 is preferred to be so set to be executable in a shorter time than the initialization processing by the second initialization processing section 231. When the initialization processing based on the excitation phase information or the like of the stepping motor 22 is carried out, the lens 21 can be stopped at a position of the termination processing time after the initialization processing is completed, by supplying power with the phase of the stepping motor 22 expressed on the excitation phase information.

That is, the lens 21 is moved to the initial position y1 at the time of termination by the second termination processing section 211. Thus, unless the initialization switching section 240 acquires any external force detection signal, the lens 21 is not loaded with an external force large enough to move its position. Thus, the lens 21 is located at the initial position y1 at the time of startup. The second position information initialization section 232 can terminate the initialization processing on the lens 21 located already at the initial position y1 by grasping the position of the lens 21 without executing the ordinary initialization processing using the detection signal I2 by the photo interrupter 25.

Because according to this embodiment, the termination position y0 of the lens 21 is set at the initial position y1, the second position information initialization section 232 does not need to move the lens 21. If the termination position y0 of the lens 21 is set in the vicinity of the initial position y1, the second position information initialization section 232 may move the position of the lens 21 by a predetermined amount. However, at this time, the initialization by the second initialization processing section 231 to the lens 21 does not need to be carried out and the lens 21 does not need to be moved to the reference position ys. Thus, the drive control unit 100 of this embodiment can execute the initialization processing on the lens 21 more rapidly than an ordinary initialization processing.

<Operation of Drive Control Unit 100>

The structures of the lens section 1 and drive control unit 100 of the camera according to an embodiment of the present invention have been described above. Next, the operation of the drive control unit 100 of this embodiment upon termination processing will be described with reference to FIGS. 4A and 4B.

(Termination Processing—Focus Lens)

FIGS. 4A and 4B are explanatory diagrams for explaining the operation of the drive control unit of this embodiment at the time of termination processing. FIG. 4A shows a termination processing on the lens 11 which is a focus lens and FIG. 4B shows a termination processing on the lens 12 which is a zoom lens.

As shown in FIG. 4A, for the lens 11, power is supplied to the photo interrupter 15 by the first termination processing section 111 at the time of termination in step S101. Then, the procedure proceeds to step S103.

In step S103, the first termination processing section 111 supplies a drive signal to the stepping motor 12 so as to move the lens 11 to the reference position xs. Then, the procedure proceeds to step S105.

In step S105, the first termination processing section 111 updates the position information of the lens 11 which reaches the reference position xs to the reference position xs so as to initialize the position information. In the meantime, this position information may be recorded in the first memory section 112 or in another memory section (not shown) for recording the position information of the lens 11 when it is usually driven. Then, the procedure proceeds to step S107.

Figure 5A:
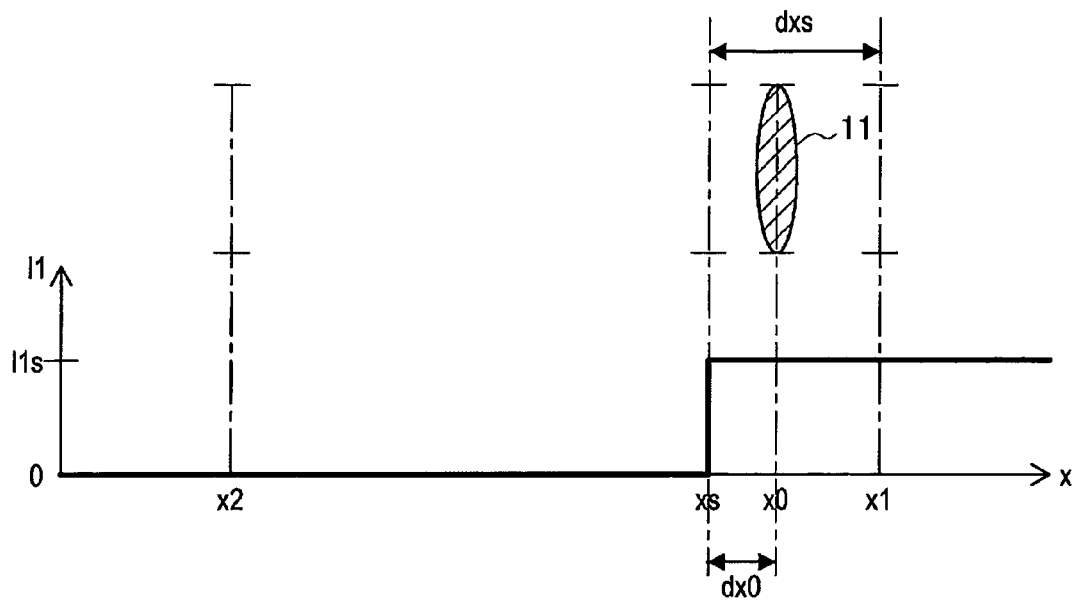
FIG. 5A is an explanatory diagram for explaining the positional relationship after the termination processing of the lens to be controlled by the drive control unit of the embodiment.

In step S107, the first termination processing section 111 moves the lens 11 to the termination position x0 in the vicinity of the photo interrupter 15 as shown in FIG. 5A. Because at this time, the first termination processing section 111 corrects the position information of the lens 11 using the photo interrupter 15, it can move the lens 11 to the termination position x0 accurately. At this time, the distance dx0 by which the lens 11 is moved is not so larger than the length from the position x1 to the position x2. Thus, the first termination processing section 111 can move the lens 11 to the termination position xs in a short time. Then, the procedure proceeds to step S109.

In step S109, the first termination processing section 111 records the position information (that is, information about the termination position xs, first position information) of the lens 11 and the value (that is, value I1s) of the detection signal I1 of the photo interrupter 15 at that position in the first memory section 112. Then, the procedure proceeds to step S111.

In step S111, the first termination processing section 111 stops the supply of power to the photo interrupter 15 and terminates the termination processing.

(Termination Processing—Zoom Lens)

On the other hand, as shown in FIG. 4B, power is supplied to the photo interrupter 25 by the second termination processing section 211 at the time of termination for the lens 21 which is a zoom lens, in step S201.

In step S203, the second termination processing section 111 supplies the stepping motor 22 with a drive signal so as to move the lens 21 to the reference position ys. Then, the procedure proceeds to step S205.

In step S205, the second termination processing section 211 updates the position information of the lens 21 which reaches the reference position ys to the reference position ys so as to initialize the position information. In the meantime, this position information may be recorded in the second memory section 212 or in another memory section (not shown) which records the position information of the lens 21 when it is usually driven. Then, the procedure proceeds to step S207.

Figure 5B:
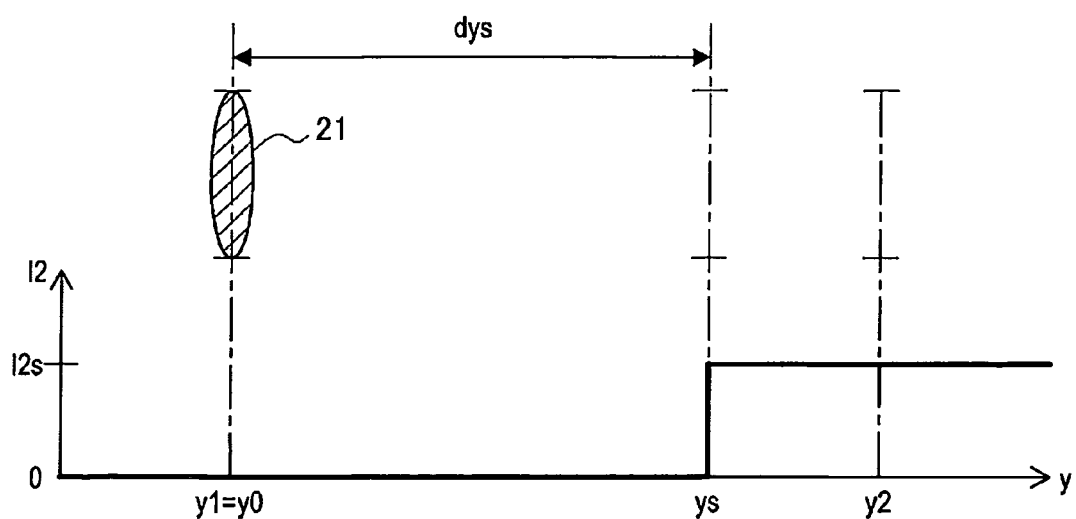
FIG. 5B is an explanatory diagram for explaining the positional relationship after the termination processing of the lens to be controlled by the drive control unit of the embodiment.

In step S207, as shown in FIG. 5B, the second termination processing section 211 moves the lens 21 to the termination position y0 which is the initial position y1. Because the second termination processing section 211 also corrects the position information of the lens 21 using the photo interrupter 25, it can move the lens 21 to the termination position y0 accurately. The distance dys by which the lens 21 is moved at this time is larger than the distance dy0 by which the lens 11 is moved. Thus, if the rotation speeds of the stepping motors 12, 22 are equal, the termination processing to the lens 21 requires a longer time than the termination processing of the lens 11. However, at the time of termination processing, in most cases, the power of the camera is simply turned off or a picked image is confirmed thereby not accompanying motions of the lenses 11, 21. Thus, even if the termination time is slightly longer, the operability and convenience for user are never dropped. Further, user does not need to recognize the operation at the time of termination processing. After the processing of this step S207 is completed, the procedure proceeds to step S209.

In step S209, the second termination processing section 211 records the position information of the lens 21 (that is, information about the termination position ys, second position information) and the value (that is, value I2s) of the detection signal I2 of the photo interrupter 25 at that position in the second memory section 212. Then, the procedure proceeds to step S211.

In step S211, the second termination processing section 211 stops the supply of power to the photo interrupter 25 and terminates the termination processing.

In the meantime, the termination processing to the lenses 11, 12 may be carried out at the same time or the termination processing for any one may be started while both of them may be executed with a time lag.

(Initialization Processing—Focus Lens)

Figure 6A:
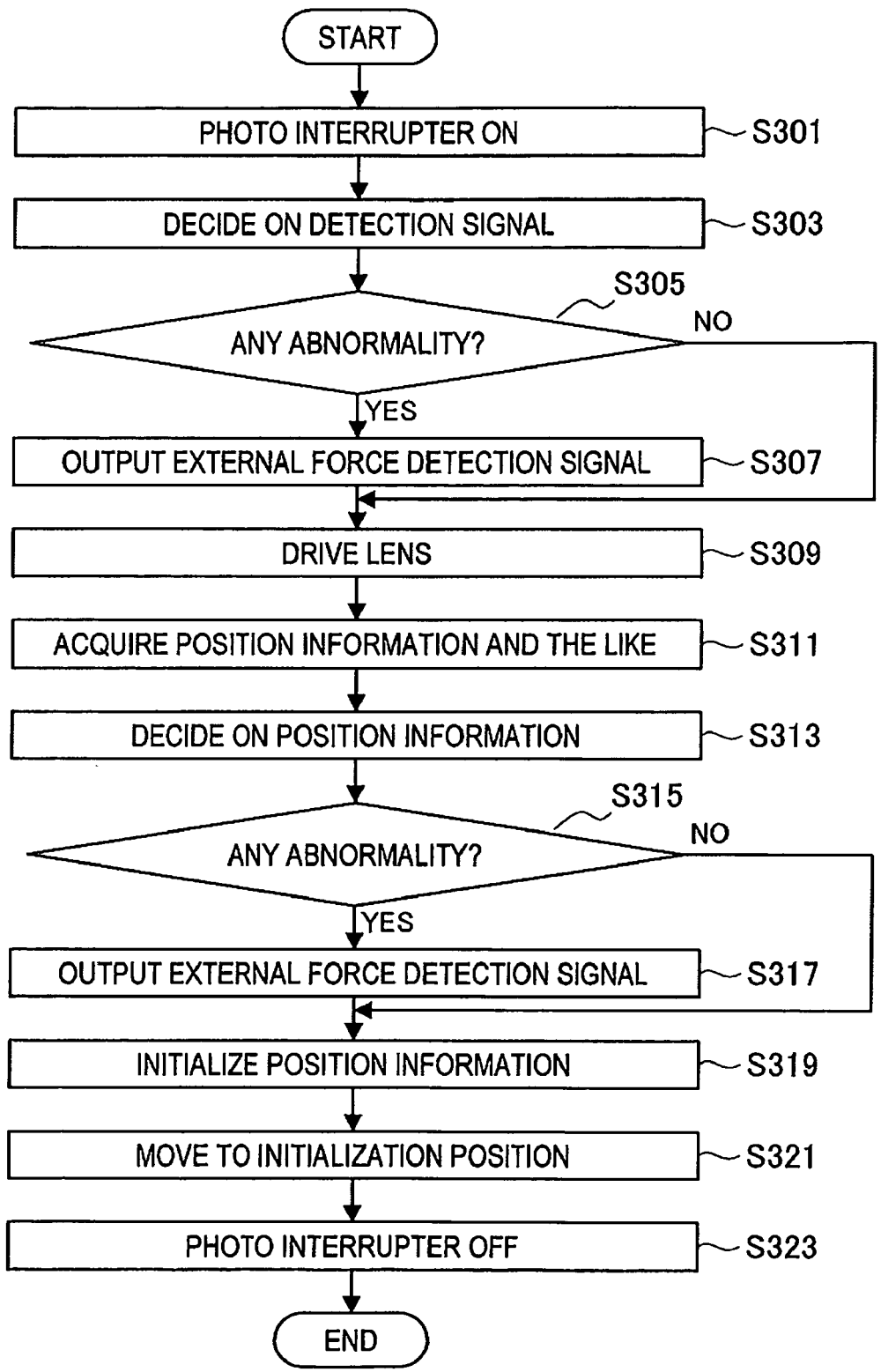
FIG. 6A is an explanatory diagram for explaining the operation at the time of startup of the drive control unit of the embodiment.
Figure 6B:
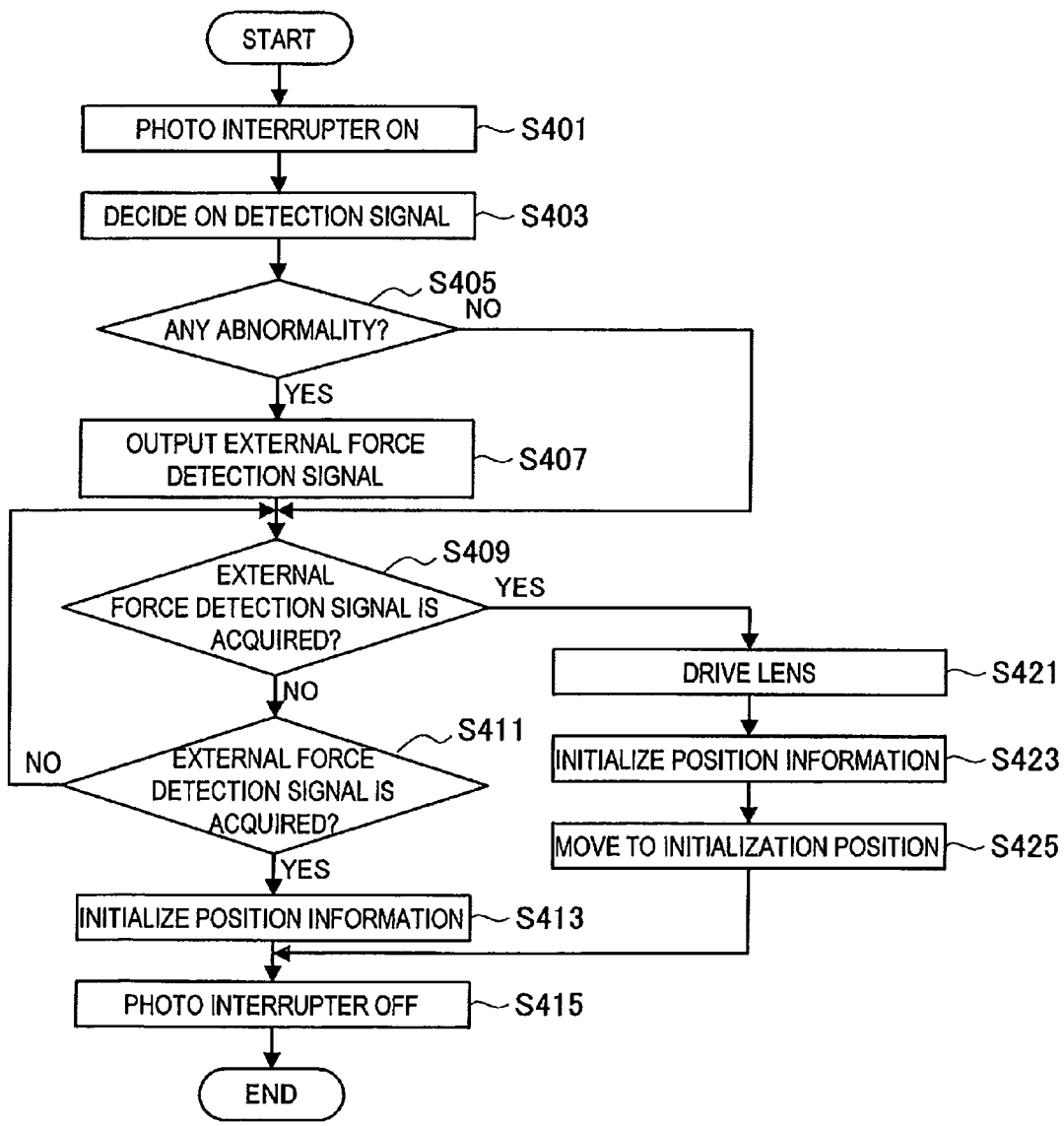
FIG. 6B is an explanatory diagram for explaining the operation at the time of startup of the drive control unit of the embodiment.

The initialization processing which is to be carried out at the time of startup, for example, when the power is turned on after the termination, will be described with reference to FIGS. 6A and 6B. FIGS. 6A and 6B are explanatory diagrams for explaining the operation of the drive control unit of this embodiment at the time of the startup. FIG. 6A shows an initialization processing for the lens 11 which is a focus lens and FIG. 6B shows an initialization processing for the lens 12 which is a zoom lens.

When the power of the camera is turned on or the operating mode is set to image pickup mode, the initialization processing for the lens 11 is started so as to execute the processing of step S301. In step S301, first, the first detection signal determining section 121 supplies the photo interrupter 15 with power and then, the procedure proceeds to step S303.

In step S303 (an example of the first external force detection step), the first detection signal determining section 121 determines the detection signal I1 of the photo interrupter 15. When the detection signal I1 at the time of startup is not equal to the detection signal I1 (value I1s) at the time of termination recorded in the first memory section 112, the first detection signal determining section 121 determines that an external force is applied (abnormality). Then, the procedure proceeds to step S305.

In step S305, the first detection signal determining section 121 verifies whether or not any abnormality is detected in step S303. If any abnormality is detected, the procedure proceeds to step S307 and unless any abnormality is detected, the procedure proceeds to step S309.

In step S307 after the abnormality is detected, the first detection signal determining section 121 outputs an external force detection signal. Then, the procedure proceeds to step S309.

On the other hand, if no abnormality is detected or in step S309 which is treated after the processing of step S307 is completed, the first initialization processing section 131 supplies the stepping motor 12 with a drive signal so as to move the lens 11 from the termination position x0 to the reference position xs. Because the termination position x0 is set in the vicinity of the reference position xs, unless the lens 11 is moved by an external force or the like, the moving distance dx0 is short and the moving time is short. Then, the procedure proceeds to step S311.

In step S311, the first position information determining section 122 acquires the first position information of the lens 11 from the first memory section 112 and then, acquires a moving amount d of the moving from the first initialization processing section 131 up to the reference position xs after the startup of the lens 11. Then, the procedure proceeds to step S313.

In step S313 (an example of the first external force detection step), the first position information determining section 122 determines whether or not any abnormality occurs, that is, whether or not any external force is applied to the lens 11 based on the first position information acquired in step S311 and the moving amount d of the lens 11 at the time of startup. Then, the procedure proceeds to step S315.

In step S315, the first position information determining section 122 confirms whether or not any abnormality is detected in step S313. Then, if any abnormality is detected, the procedure proceeds to step S317 and if no abnormality is detected, the procedure proceeds to step S319.

In step S317 after any abnormality is detected, the first position information determining section 122 outputs an external force detection signal. Then, the procedure proceeds to step S319.

On the other hand, if any abnormality is detected or in step S319 treated after the processing of step S317 is completed, the first initialization processing section 131 updates the position information of the lens 11 at the time of ordinary drive recorded in the first memory section 112 or another memory section (not shown) to the reference position xs. If the lens 11 is already moved for the reason of an applied external force, there is a possibility that this position information is shifted. Then, by initializing the position information to the reference position xs when the lens 11 is located at the reference position xs, the position information can be updated to proper position information. After the processing of step S319, the procedure proceeds to step S321.

In step S321, the first initialization processing section 131 supplies the stepping motor 12 with a drive signal so as to move the lens 11 from the reference position xs to the initial position x1. Because at this time, the reference position xs is set in the vicinity of the initial position x1, the moving distance dy1 is short and the moving time is short. Then, the procedure proceeds to step S323.

In step S323, the first initialization processing section 131 stops a supply of power to the photo interrupter 15 so as to terminate the initialization processing to the lens 11.

(Initialization Processing—Zoom Lens)

On the other hand, when the power of the camera is turned on or the operating mode is set to the image pickup mode as shown in FIG. 4B, the initialization processing to the lens 11 which is a zoom lens is started so as to execute the processing of step S401. In step S401, the photo interrupter 25 is supplied with power by the second detection signal determining section 221. Then, the procedure proceeds to step S403.

In step S403, the second detection signal determining section 221 determines the detection signal I2 of the photo interrupter 25. That is, when the detection signal I2 at the time of startup is not equal to the detection signal I2 (value 0) at the time of termination recorded in the second memory section 212, the second detection signal determining section 221 determines that an external force is applied (abnormality). Then, the procedure proceeds to step S405.

In step S405, the second detection signal determining section 221 confirms whether or not any abnormality is detected in step S403. If any abnormality is detected, the procedure proceeds to step S407 and if no abnormality is detected, the procedure proceeds to step S409.

In step S407 after the abnormality is detected, the second detection signal determining section 221 outputs an external force detection signal. Then, the procedure proceeds to step S409.

On the other hand, if no abnormality is detected or in step S409 treated after the processing of step S407 is completed, the initialization switching section 240 confirms whether or not an external force detection signal has been acquired. In the meantime, this external force detection signal is output in step S307 (first detection signal determining section 121) at the time of initialization processing to the lens 11, step S317 (first position information determining section 122) or step S407 (second detection signal determining section) at the time of initialization processing to the lens 21. If no external force detection signal is acquired, the procedure proceeds to step S411 and if the external force detection signal is acquired, the initialization switching section 240 makes the second initialization processing section 231 start ordinary initialization processing and the procedure proceeds to step S421.

If the procedure proceeds to step S411 without acquisition of the external force detection signal, the initialization switching section 240 confirms whether or not detection of any abnormality in other lens 11 is terminated or the processing of step 305 and step S315 in FIG. 6A is completed. Then, unless the abnormality detection of the lens 11 is terminated, the processing of step S409 is executed repeatedly. If the detection of an abnormality of the lens 11 is terminated without acquisition of the external force detection signal when the abnormality detection of the lens 11 is terminated, the initialization switching section 240 makes the second position information initialization section 232 start the initialization processing and the procedure proceeds to step S413.

In step S409, the initialization switching section 240 selects an initialization processing to the lens 21 depending on whether or not any external force detection signal is present. At that time, the external force detection signal is output from not only the second detection signal determining section 221 to the lens 21 as described above, but also from the first detection signal determining section 121 and the first position information determining section 122 to the lens 11. Thus, until the abnormality detection by the first detection signal determining section 121 and the first position information determining section 122 is terminated in step S411, step S409 is repeated. Although the processing of step S409 may be carried out without provision of step S411 after the abnormality detection processing by the first detection signal determining section 121 and the first position information determining section 122, the procedure can proceed to step S421 immediately when the external force detection signal is output, by repeating step S409 like this embodiment, thereby reducing the initialization processing time.

When the procedure proceeds to step S413, the second position information initialization section 232 updates the position information of the lens 21 at the time of ordinary drive recorded in the second memory section 212 or another memory section (not shown) to the termination position y0 (that is, initial position y1) in step S413. When the procedure proceeds to step S413, no external force is applied to the lens 21, so that the lens 21 remains at the termination position y0, which is the initial position y1. Thus, the second position information initialization section 232 updates only the position information without moving the lens 21. The procedure proceeds to step S415 after the processing of step S413 is completed.

In step S415, the second position information initialization section 232 stops the supply of power to the photo interrupter 25 so as to terminate the initialization processing to the lens 21.

On the other hand, when the external force detection signal is acquired and the procedure proceeds to step S421, processing of steps S421 to step S427 (an example of the second initialization processing step) is executed and the ordinary initialization processing to the lens 21 by the first initialization processing section is carried out.

That is, in step S421, the second initialization processing section 231 supplies the stepping motor 22 with a drive signal so as to move the lens 21 to the reference position ys. Then, the procedure proceeds to step S423.

In step S423, the second initialization processing section 231 updates the position information of the lens 21 at the time of ordinary drive recorded in the second memory section 212 or another memory section (not shown) to the reference position ys. If any external force detection signal has been acquired, it means that the lens 21 has been already moved by an external force. Thus, this position information has been shifted. Then, initializing the position information to the reference position ys when the lens 21 is located at the reference position ys enables this position information to be updated to proper position information. After this step S423 is treated, the procedure proceeds to step S425.

In step S425, the second initialization processing section 231 supplies the stepping motor 22 with a drive signal so as to move the lens 21 from the reference position ys to the initial position y1. Then, the procedure proceeds to step S415.

In step S415, the second initialization processing section 231 stops the supply of power to the photo interrupter 25 and terminates the initial processing for the lens 21.

<Example of External Force Detection>

The operation of the drive control unit 100 according to an embodiment of the present invention has been described above. This drive control unit 100 detects that an external force is applied to the lens 11 in steps S303 and S313 and the like, and detects that an external force is applied to the lens 21 in step S403 and the like. Then, the drive control unit 100 determines whether a simple initialization processing (step S413) is carried out to the lens 21 or the ordinary initialization processing (steps S421 to S425) is carried out depending on whether or not an external force is applied (step S409). As a result of such an operation, unless the lens 21 is moved by the external force, the startup time can be reduced by the simple initialization processing. On the other hand, if the lens 21 has been moved by the external force, the position of the lens 21 can be controlled accurately by the ordinary initialization processing. An example of external force detection by this operation will be described with reference to FIGS. 7A to 9B.

(First External Force Detection Example)

Figure 7A:
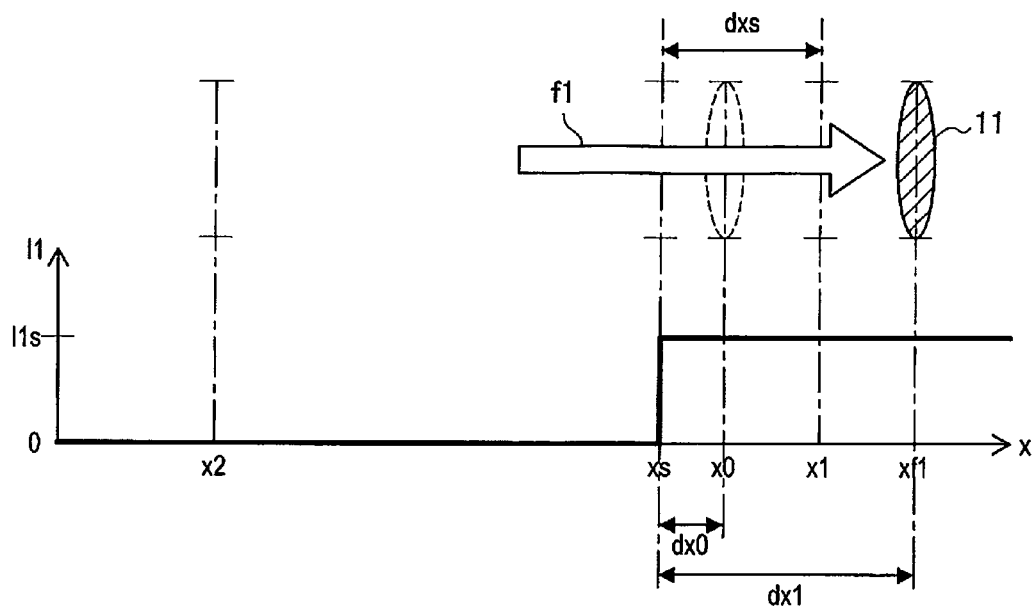
FIG. 7A is an explanatory diagram for explaining a first external force detection example by the drive control unit of the embodiment.
Figure 7B:
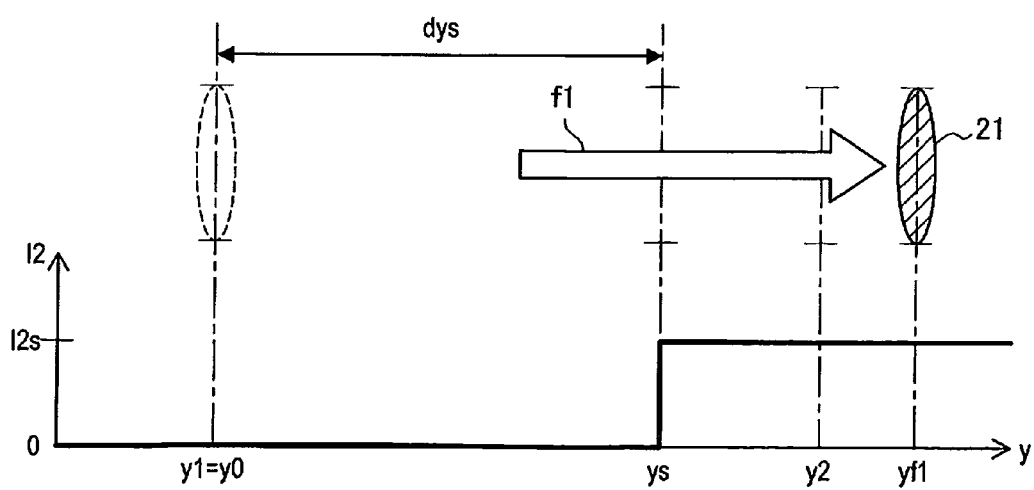
FIG. 7B is an explanatory diagram for explaining the first external force detection example by the drive control unit of the embodiment.

The first external force detection example will be described with reference to FIGS. 7A and 7B.

After the termination processing is carried out as described above, the lenses 11, 21 are located at the termination positions x0, y1 as shown in FIGS. 5A and 5B. Assume that a large external force f1 is applied in the plus direction of the x-axis and y-axis before the initialization processing is carried out. Then, as shown in FIGS. 7A and 7B, the lenses 11 and 21 are moved largely in the plus direction of the x-axis and y-axis. In this case, the lens 21 is moved until the detection signal I2 of the photo interrupter 25 is changed (that is, the value 0 turns to the value I2s). Thus, in this case, the second detection signal determining section 221 can detect this external force f1 (step S403 and the like).

(Second External Force Detection Example)

Figure 8A:
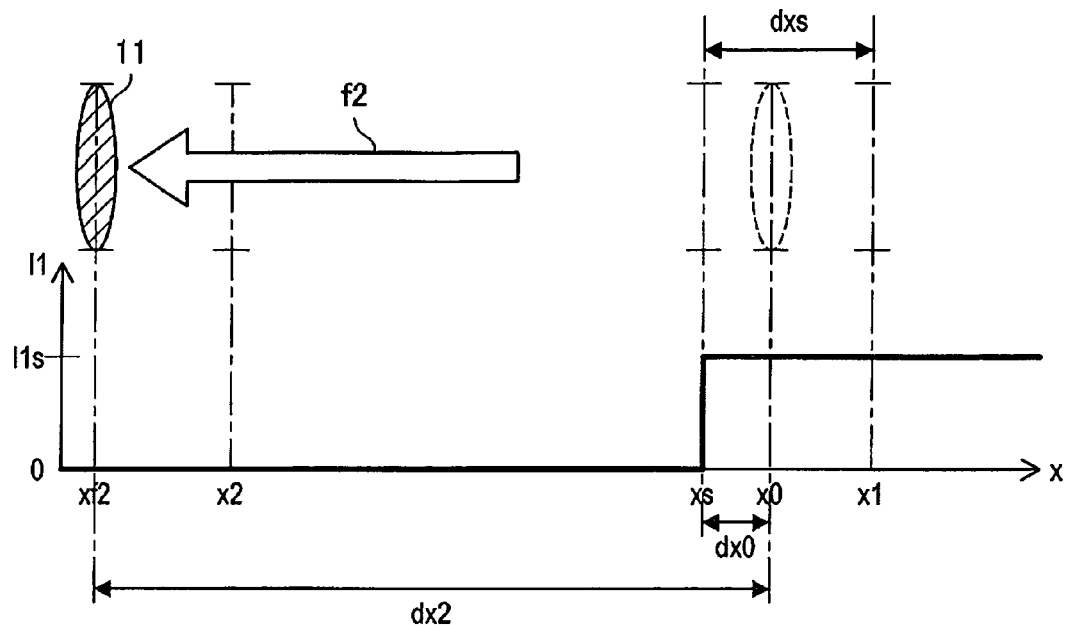
FIG. 8A is an explanatory diagram for explaining the first external force detection example by the drive control unit of the embodiment.
Figure 8B:
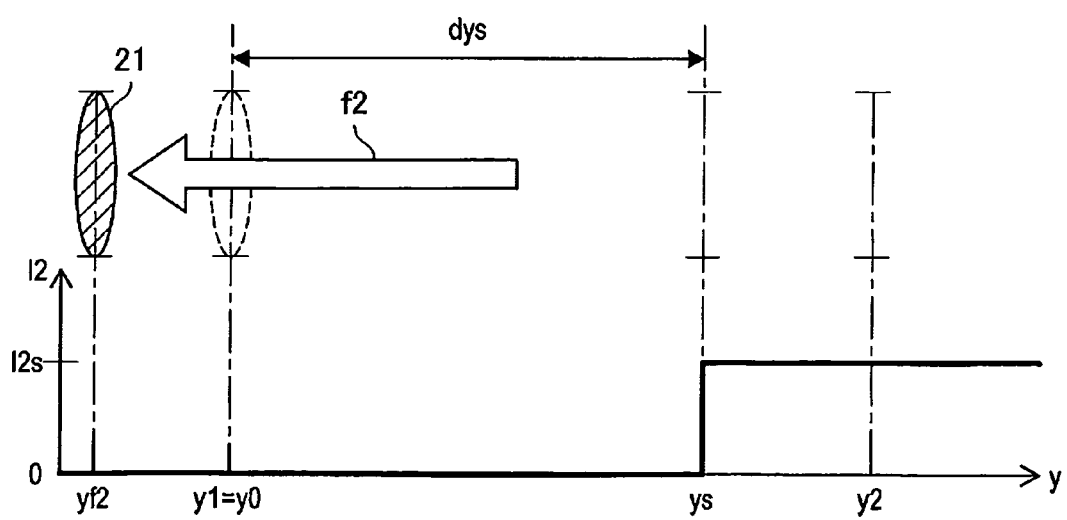
FIG. 8B is an explanatory diagram for explaining the first external force detection example by the drive control unit of the embodiment.

Next, the second external force detection example will be described with reference to FIGS. 8A and 8B.

In the second external force detection example, assume that a large external force f2 is applied in an opposite direction to the first external force detection example, that is, in the minus direction of the x-axis and y-axis. Then, as shown in FIGS. 8A and 8B, the lens 11 and the lens 21 are moved largely in the minus direction of the x-axis and y-axis. In this case, the lens 11 is moved until the detection signal I1 of the photo interrupter 15 is changed (that is, the value I1s turns to the value 0). Thus, in this case, the first detection signal determining section 121 can detect this external force f2 (step S303 and the like).

(Third External Force Detection Example)

Figure 9A:
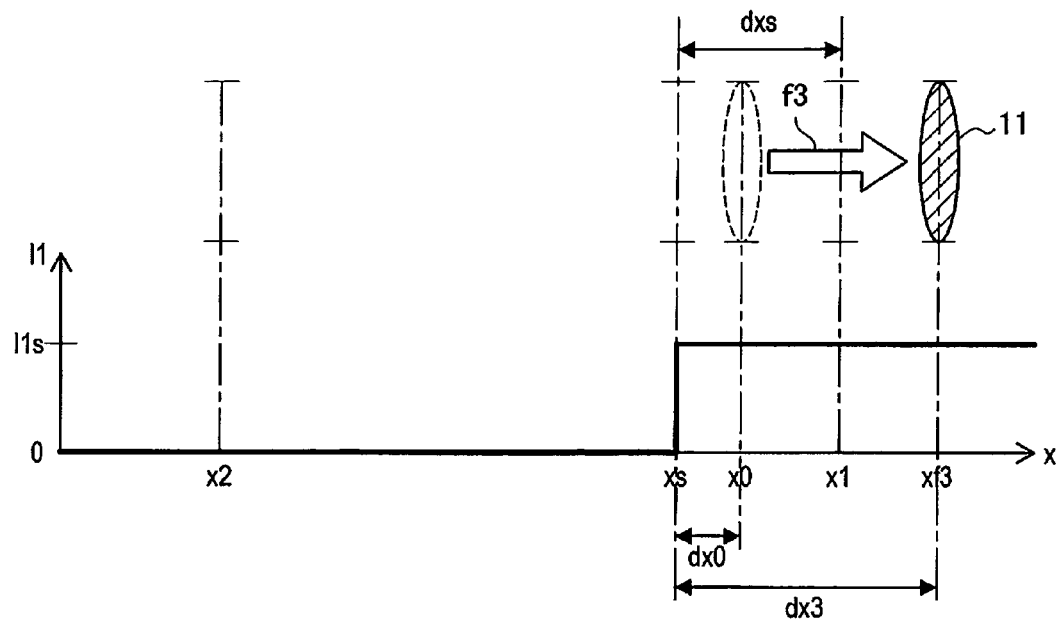
FIG. 9A is an explanatory diagram for explaining the first external force detection example by the drive control unit of the embodiment.
Figure 9B:
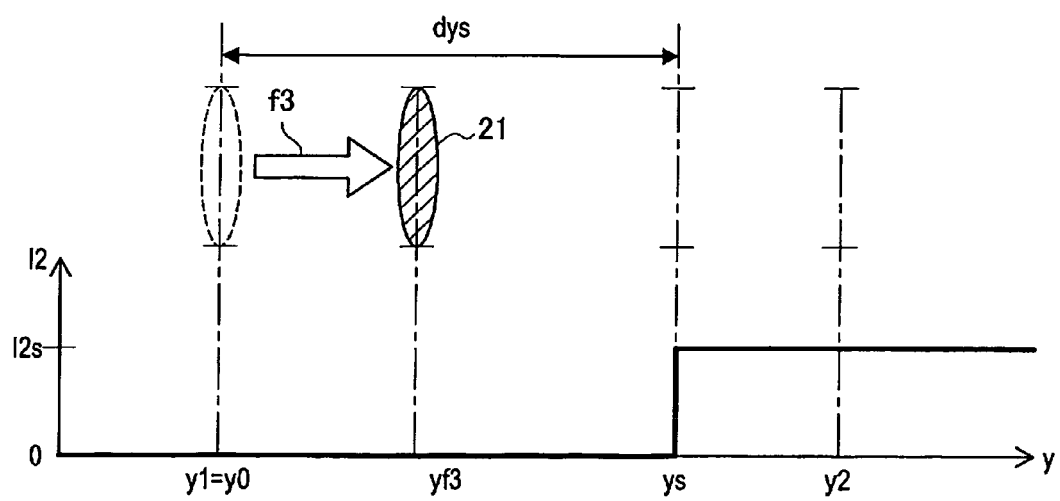
FIG. 9B is an explanatory diagram for explaining the first external force detection example by the drive control unit of the embodiment.

The third external force detection example will be described with reference to FIGS. 9A and 9B.

In the first external force detection example and second external force detection example, it has been described that so large external forces f1, f2 that any one of the detection signals I1, I2 of the photo interrupters 15, 25 is changed is applied. However, if the external force f3 is not so large as the detection signals I1, I2 of the photo interrupters 15, 25 is changed as shown in FIGS. 9A and 9B, the first position information determining section 122 detects a shift of the position of the lens 11 so as to detect the external force f2 (step S313 and the like).

Thus, as evident from the first to third external force detection examples, the drive control unit 100 of this embodiment can detect an external force capable of moving the lenses 11, 21 regardless of the magnitude and direction thereof. Then, the initialization processing of the lens 21 can be switched based on whether or not any external force is applied.

<Example of Effect of Drive Control Unit 100>

The drive control unit 100 according to an embodiment of the present invention has been described above. This drive control unit 100 can detect that an external force is applied to the lens 11. When the external force is applied, the possibility that the lens 21 has been moved is determined to be high and the ordinary initialization processing by the photo interrupter 15 is carried out. On the other hand, unless any external force is applied, it is determined that the lens 21 has not been moved and the simple initialization processing can be executed instead of the ordinary initialization processing. In the simple initialization processing of this case, only the position information is updated without moving the lens 21. Thus, under an environment which user might usually use, the startup processing time can be reduced by an amount corresponding to the moving time for moving the lens 21. Particularly, by moving the lens 21 in which the distance up to a detection position (reference position ys) of the photo interrupter 15 is long to the initial position y0 at the time of termination and executing the simple initialization processing to the lens 21, the startup processing time can be reduced effectively.

If a plurality of actuators (for example, stepping motors 12, 22) cannot be driven at the same time due to electrical restriction of the unit, usually, the initialization processing needs to be executed successively to a moving object body which is driven by each actuator whereby increasing the startup processing time. However, in the drive control unit 100 of this embodiment, only the initialization processing to an actuator needs to be executed even in this case unless any external force is applied. Thus, the startup processing time can be reduced effectively.

Further, the drive control unit 100 of this embodiment does not need any sensor in order to reduce the startup processing time by simplifying the initialization processing. Thus, manufacturing cost can be reduced. Because there is no necessity of securing a space for arrangement of other sensor and the like, the lens section 1 of the camera can be reduced in size.

By using the lens 11 which is moved more easily due to an influence of the external force than the other lenses as an external force detecting object, it can be detected that the external force is applied accurately. Further, by executing external force detection based on the detection signals I1, I2 of the photo interrupters 15, 25 which can detect the external force in a short time for the lens 21 as well as the lens 11, the external force detection precision can be improved. By disposing the lens 11 in the plus direction of the x-axis and the lens 21 in the minus direction of the x-axis (that is, in the minus direction of the y-axis) at the time of termination, the external force can be detected accurately in a short time regardless of the direction of the applied external force.

Any moving object body for which the ordinary initialization processing can be carried out in a short time such as the lens 11 is picked up as the external force detecting object and that lens 11 is moved by executing the ordinary initialization processing thereon. As a result, any position shift of the lens 11 can be detected and consequently, even a weak external force can be detected accurately as long as it is a force of a magnitude to an extent that the lenses 11, 21 are affected.

The present application contains subject matter related to that disclosed in Japanese Priority Patent Application JP 2008-114279 filed in the Japan Patent Office on Apr. 24, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

According to the above-described embodiment, for example, the photo interrupters 15, 25 and the light shielding panels 16, 26 are picked up as an example of the first and second position detecting sections and a case where the position detecting mechanism 14, 24 which has the photo interrupters and the light shielding panels detects whether the lens 11, 21 is located in front of or in the back of the reference positions xs, ys has been described above. However, the first and second position detecting sections of the present invention are not limited to this example. That is, as the first and second position detecting sections, it is permissible to use a mechanical type contact sensor, a non-contact sensor using electric field or magnetic field, other sensor using light or the like. As the first and second position detecting sections, any sensor capable of measuring the positions of the lenses 11, 21 quantitatively may be used.

A case where the first external force detecting section 120 and the second external force detecting section 220 have the first detection signal determining section 121 and the first position information determining section 122 or the second detection signal determining section 221 and the external force is detected based on the position information of the lenses 11, 21 has been described. However, the first external force detecting section and the second external force detecting section possessed by the present invention are not restricted to this example. For example, it is permissible to use a sensor capable of detecting an external force directly even if the power is turned off like an acceleration sensor.

The external force can be applied to the lenses 11, 21 in other cases than when the camera is dropped or the camera strikes an obstacle. For example, if the temperature is changed rapidly, it can be considered that the external force might be applied to the lenses 11, 21 due to changes in temperature of any supporting member and the like. In this case, the first external force detecting section 120 and the second external force detecting section 220 may have, for example, a thermometer and detect a rapid change in temperature so as to detect any external force. If the camera is kept inactivated in a long period, a possibility that the external force may be applied to the lenses 11, 21 due to changes of the supporting member and the like with a passage of time can be considered. In this case, the first external force detecting section 120 and the second external force detecting section 220 may have, for example, a timer and detect an external force when the camera is kept inactivated in a predetermined period. If the attitude and angle of the camera are changed, a possibility that the external force is applied to the lenses 11, 21 due to the gravity or an acceleration by the change of the attitude can be considered. In this case, the first external force detecting section 120 and the second external force detecting section 220 may have for example, an acceleration sensor and detect the external force when the direction or magnitude of the acceleration is changed. Thus, the lenses 11, 21 (that is, moving object body) can be loaded with the external force due to various factors. The first external force detecting section 120 and the second external force detecting section 220 can detect the external force using a sensor depending on these various factors.

In the above embodiment, the stepping motors 12, 22 have been described as an example of an actuator for moving the moving object body. However, the actuator for moving the moving object of the present invention is not limited to this example. As for such an actuator, it is permissible to use an actuator such as a DC motor capable of maintaining the position of the moving object body against an external force of some extent even if no excitation current flows so that it is not driven (that is, it is not supplied with power).

Although in the above embodiment, the moving object body has been described by taking the two lenses 11, 21 as an example, the present invention is not limited to this example. The drive control unit 100 can control two or more moving object bodies. In this case, as the moving object body for executing the ordinary initialization processing for detecting an external force, one unit may be used as described above or two or more may be used to enhance the detection accuracy for the external force.

In the above embodiment, a case where the initialization processing is carried out after the termination processing is executed normally has been described. On the other hand, in abnormal initialization processing which is carried out when the power of the camera is turned on first or the termination processing is not executed normally, the drive control unit 100 executes no simple initialization processing. Instead, preferably, the drive control unit 100 executes the ordinary initialization processing (steps S421 to S435 of FIG. 6B) for all the moving object bodies including the lens 21 regardless of whether or not the external force detection signal is present.

The series of the processings described in the above embodiments may be executed with a specialized hardware or with a software. In case where the series of the processings are executed with the software, the above-described series of processings can be achieved by executing a program with a general-purpose or specialized computer as shown in FIG. 10.

Figure 10:
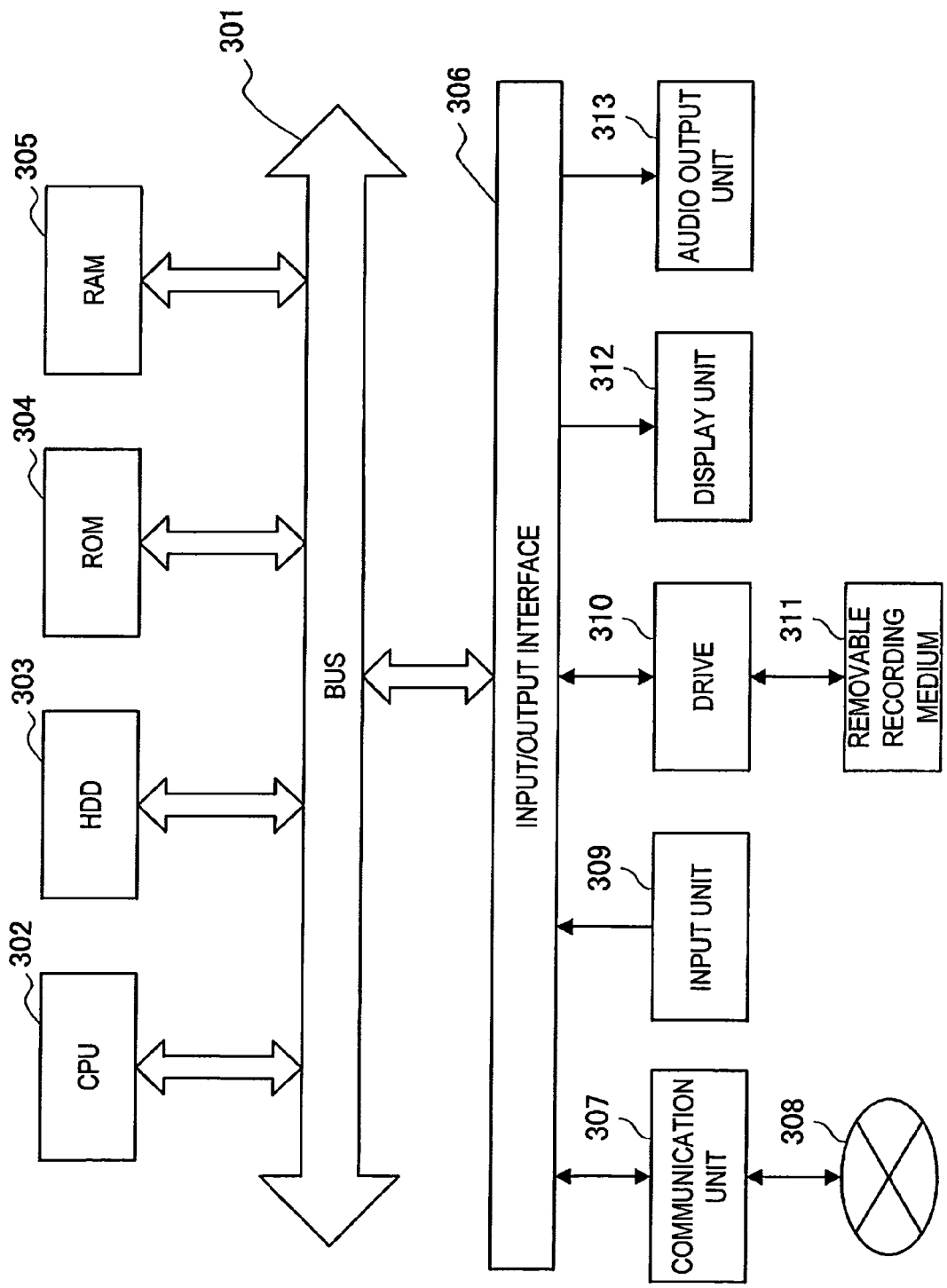
FIG. 10 is an explanatory diagram for explaining a configuration example of a computer for achieving a series of processings by executing its program.

FIG. 10 is an explanatory diagram for explaining an example of the configuration of the computer for achieving a series of processings by executing the program. The program for carrying out the series of the processings is executed with a computer as follows.

As shown in FIG. 10, the computer includes a central processing unit (CPU) 302 connected through, for example, a bus 301 and an I/O interface 306 or the like, a recording unit such as a hard disk drive (HDD) 303, a read only memory (ROM) 304, a random access memory (RAM) 305, a communication unit 307 which can be connected to a network 308 such as a local area network (LAN), Internet, input unit 309 such as a mouse, keyboard (not shown), a drive 310 for reading/writing in/from a magnetic disc such as flexible disc, an optical disc such as various kinds of compact discs (CD), magneto optical (MO) disc, digital versatile disc (DVD) or removable recording medium 311 such as a semiconductor memory, a display unit 313 such as a monitor, audio output unit 313 such as a speaker and a head phone and the like.

The CPU 303 executes various kinds of processings according to a program recorded in the recording unit, a program received through the network 308, a program read out from the removable recording medium 312 or the like so as to achieve the above-mentioned series of the processings. At this time, the CPU 302 may execute various kinds of the processings based on information or signal input from the input unit 309 as required.

The steps described on the flow chart of this specification include not only processings to be executed in time series along the described sequence but also processings to be executed in parallel or independently even if they are not executed in time series. Needless to say, the steps intended to be executed in time series can be changed in their sequence appropriately depending on a case.

What is claimed is:

1. A drive control unit comprising:
a first external force detecting section for detecting that an external force is applied to a first moving object body movable back and forth in a single direction;
a second initialization processing section which executes initialization processing for a position of at least one of second moving object bodies movable back and forth in the single direction depending on a detection result by the first external force detecting section; and
a first memory section for recording position information of the first moving object body at a time of operation termination before a startup,
wherein the first external force detecting section detects that an external force is applied to the first moving object body based on the position information recorded in the first memory section and a detection result at the time of startup by a first position detecting section for detecting the position of the first moving object body.

2. The drive control unit according to claim 1, wherein the first position detecting section generates a detection signal indicating whether the first moving object body is located in front of or in the back of the predetermined first reference position and
the first external force detecting section, if a detection signal by the first position detecting section at the time of startup does not coincide with a detection signal detected by the first position detecting section when the first moving object body is located at a position memorized in the first memory section, detects that the external force is applied to the first moving object body.

3. The drive control unit according to claim 1, further comprising a first termination processing section for moving the first moving object body to the vicinity of the first reference position at the time of operation termination before the startup.

4. The drive control unit according to claim 3, wherein the first external force detecting section detects an external force applied to a moving object body which can be moved more easily back and forth in the single direction by the external force than the at least one of the second moving object bodies, as the first moving object body.

5. The drive control unit according to claim 1, further comprising a first initialization processing section for moving the first moving object body to the predetermined first initial position based on a detection result by the first position detecting section at the time of the startup,
wherein the first external force detecting section detects that the external force is applied to the first moving object body based on the moving amount of the first moving object body by the first initialization processing section and the position information of the first moving object body memorized in the first memory section.

6. A drive control unit comprising:
a first external force detecting section for detecting that an external force is applied to a first moving object body movable back and forth in a single direction; and
a second initialization processing section which executes initialization processing for the position of at least one of second moving object bodies movable back and forth in the single direction depending on a detection result by the first external force detecting section, wherein when it is detected that the external force is applied to the first moving object body by the first external force detecting section, the second initialization processing section moves at least one of the second moving object bodies to a predetermined second initial position and when it is not detected that the external force is applied to the first moving object body, does not move the second moving object body, the drive control unit further comprising:

a second memory section for recording the position information of the second moving object body at the time of operation termination before the startup; and a second external force detecting section for detecting that the external force is applied to the second moving object body based on the position information recorded in the second memory section and the detection result at the time of the startup by the second position detecting section for detecting the position of the second moving object body, wherein the second initialization processing section, when it is detected that the external force is applied to the second moving object body by the second external force detecting section, moves the second moving object body to the predetermined second initial position.

7. The drive control unit according to claim 6, wherein the second position detecting section generates a detection signal indicating whether the second moving object body is located in front of or in the back of the predetermined second reference position, and the second external force detecting section, if a detection signal by the second position detecting section at the time of startup does not coincide with a detection signal detected by the second position detecting section when the second moving object body is located at a position memorized in the second memory section, detects that the external force is applied to the second moving object body.

8. A drive control method comprising:

a first external force detecting step of detecting that an external force is applied to a first moving object body movable back and forth in a single direction;

a second initialization processing step of executing initialization processing for the position of at least one of second moving object bodies movable back and forth in the single direction depending on a detection result in the first external force detection step; and recording position information of the first moving object body at a time of operation termination before a startup, wherein the first external force detecting step detects that an external force is applied to the first moving object body based on the recorded position information and a detection result at the time of startup obtained by a first position detecting step for detecting the position of the first moving object body.

9. A non-transitory computer readable medium having stored thereon a program for making a computer achieve:

a first external force detecting function for detecting that an external force is applied to a first moving object body movable back and forth in a single direction;

a second initialization processing function for executing initialization processing for the position of at least one of second moving object bodies movable back and forth in the single direction depending on a detection result by the first external force detection function; and a first memory function for recording position information of the first moving object body at a time of operation termination before a startup, wherein the first external force detecting function detects that an external force is applied to the first moving object body based on the position information recorded by the first memory function and a detection result at the time of startup obtained by a first position detecting function for detecting the position of the first moving object body.

* * * * *